(12) United States Patent
Wu et al.

(10) Patent No.: US 10,680,867 B2
(45) Date of Patent: Jun. 9, 2020

(54) CONTROL CHANNEL TRANSMISSION METHOD, NETWORK DEVICE, AND TERMINAL DEVICE

(71) Applicant: Huawei Technologies Co., Ltd., Shenzhen (CN)

(72) Inventors: Zuomin Wu, Shenzhen (CN); Lei Guan, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 16/370,563

(22) Filed: Mar. 29, 2019

(65) Prior Publication Data

US 2019/0229965 A1 Jul. 25, 2019

Related U.S. Application Data

(63) Continuation of application No. PCT/CN2016/101362, filed on Sep. 30, 2016.

(51) Int. Cl.
| | |
|---|---|
| *H04L 27/26* | (2006.01) |
| *H04W 72/12* | (2009.01) |
| *H04W 72/14* | (2009.01) |
| *H04L 1/00* | (2006.01) |
| *H04L 25/02* | (2006.01) |
| *H04L 5/00* | (2006.01) |

(52) U.S. Cl.
CPC .......... *H04L 27/2613* (2013.01); *H04L 1/00* (2013.01); *H04L 1/0038* (2013.01); *H04L 5/0051* (2013.01); *H04L 5/0053* (2013.01); *H04L 25/02* (2013.01); *H04W 72/1273* (2013.01); *H04W 72/14* (2013.01)

(58) Field of Classification Search
CPC .................................................... H04L 27/2613
USPC .......................................... 370/260; 375/260
See application file for complete search history.

(56) References Cited

U.S. PATENT DOCUMENTS

| | | |
|---|---|---|
| 2010/0260124 A1 | 10/2010 | Noshio et al. |
| 2011/0045860 A1 | 2/2011 | Nam et al. |
| 2013/0121276 A1 | 5/2013 | Kim et al. |
| 2013/0182664 A1* | 7/2013 | Chen .................. H04W 72/042 370/329 |

(Continued)

FOREIGN PATENT DOCUMENTS

| | | |
|---|---|---|
| CN | 101119277 A | 2/2008 |
| CN | 101378306 A | 3/2009 |

(Continued)

OTHER PUBLICATIONS

Huawei, et al., "sPDCCH design for short TTI", 3GPP TSG RAN WG1 Meeting #86, R1-166148, Gothenburg, Sweden, Aug. 22-26, 2016; 7 pages, XP051125241.

(Continued)

*Primary Examiner* — Lihong Yu
(74) *Attorney, Agent, or Firm* — Slater Matsil, LLP

(57) ABSTRACT

Embodiments of the present invention provide a control channel transmission method, a network device, and a terminal device. The method includes: mapping a first control channel to M consecutively-numbered first transmission elements, where the first control channel is used to schedule a data channel, a transmission element is a smallest unit used to transmit a control channel, and M≥1; and sending the first control channel to a terminal device.

17 Claims, 11 Drawing Sheets

(56) References Cited

U.S. PATENT DOCUMENTS

| | | | |
|---|---|---|---|
| 2013/0329686 A1 | 12/2013 | Kim et al. | |
| 2014/0071935 A1* | 3/2014 | Papasakellariou | H04L 5/0053 370/330 |
| 2014/0112280 A1* | 4/2014 | Lee | H04W 72/04 370/329 |
| 2014/0140306 A1 | 5/2014 | Malladi et al. | |
| 2015/0063281 A1 | 3/2015 | Xu | |
| 2016/0249334 A1 | 8/2016 | Feng et al. | |
| 2016/0295560 A1* | 10/2016 | Chen | H04L 1/0038 |
| 2017/0142715 A1 | 5/2017 | Li et al. | |

FOREIGN PATENT DOCUMENTS

| | | |
|---|---|---|
| CN | 101383657 A | 3/2009 |
| CN | 101729455 A | 6/2010 |
| CN | 101771462 A | 7/2010 |
| CN | 101843022 A | 9/2010 |
| CN | 102711253 A | 10/2012 |
| CN | 103430469 A | 12/2013 |
| CN | 104219036 A | 12/2014 |
| CN | 104770030 A | 7/2015 |
| JP | 2013529414 A | 7/2013 |
| JP | 2016139889 A | 8/2016 |
| WO | 2009057283 A1 | 5/2009 |
| WO | 2016119571 A1 | 8/2016 |

OTHER PUBLICATIONS

ZTE, "CCE allocation scheme in PDCCH for efficient blind detection," 3GPP TSG-RAN WG1 #50bis, R1-074218, Shanghai, China, Oct. 8-12, 2007, 3 pages.

3rd Generation Partnership Project; Technical Specification Group Radio Access Network; Evolved Universal Terrestrial Radio Access (E-UTRA); Physical channels and modulation (Release 13), 3GPP TS 36.211 V13.3.0 (Sep. 2016), 169 pages.

Ericsson, "sPDCCH search space design," 3GPP TSG-RAN WG1 #85, R1-165293, Nanjing, P.R. China, May 23-27, 2016, 6 pages.

Dahlman, E et al., "4G: LTE/LTE-Advanced for Mobile Broadband," Second Edition, Copyright ©2014, 2011 Erik Dahlman, Stefan Parkvall and Johan Sköld, published by Elsevier Ltd., 509 pages.

\* cited by examiner

CONTROL CHANNEL TRANSMISSION METHOD, NETWORK DEVICE, AND TERMINAL DEVICE

CROSS-REFERENCE TO RELATED APPLICATIONS

This application is a continuation of International Application No. PCT/CN2016/101362, filed on Sep. 30, 2016, the disclosure of which is hereby incorporated by reference in its entirety.

TECHNICAL FIELD

The present invention relates to the communications field, and more specifically, to a control channel transmission method, a network device, and a terminal device.

BACKGROUND

In a typical wireless communications network, for example, a Long Term Evolution (LTE) network, selection of a shared data channel is based on a scheduling/grant mechanism, and is completely controlled by a base station (BS). In the mechanism, a network device sends, to a terminal device, a control channel used to schedule a data channel. Control channels may be classified into two categories. One is downlink grant (DL Grant). The network device sends a downlink grant to the terminal device to notify the terminal device of a downlink transmission resource allocated to the terminal device, and accordingly the terminal device receives downlink data on the granted downlink transmission resource. The other one is uplink grant (UL Grant). The network device sends an uplink grant to the terminal device to notify the terminal device of an uplink transmission resource allocated to the terminal device, and accordingly the terminal device sends uplink data on the granted uplink transmission resource.

When sending the control channel, the network device needs to map the control channel to a control channel element (CCE). However, the network device performs random mapping when mapping the control channel. Consequently, the terminal device has to perform blind detection a plurality of times to obtain the control channel, and complexity of blind detection on CCEs by the terminal device is high.

SUMMARY

This application provides a control channel transmission method, a network device, and a terminal device, so that a quantity of times a terminal device performs blind detection can be reduced, and blind detection complexity for the terminal device can be reduced.

According to a first aspect, a control channel transmission method is provided. The method includes: mapping a first control channel to M consecutively-numbered first transmission elements, where the first control channel is used to schedule a data channel, a transmission element is a smallest unit used to transmit a control channel, and M 1; and sending the first control channel to a terminal device.

In this solution, a control channel is mapped to M consecutively-numbered transmission elements, so that a quantity of times the terminal device performs blind detection can be reduced, and blind detection complexity for the terminal device can be reduced.

In a possible implementation of the first aspect, the mapping a first control channel to M consecutively-numbered first transmission elements includes: mapping the first control channel to the M consecutively-numbered first transmission elements in an order that the first control channel is first mapped to a transmission element having a largest number in the M first transmission elements.

In this solution, when mapping the first control channel, a network device first maps the first control channel to the transmission element having the largest number. During blind detection, the terminal device can correctly perform demodulation only when it is assumed that a control channel is first mapped to a transmission element having a largest number. In this way, the transmission element that has the largest number and that is used to transmit the control channel can be determined, and a probability that the terminal device correctly identifies an occupied transmission element can be increased.

Optionally, in a possible implementation of the first aspect, the mapping a first control channel to M consecutively-numbered first transmission elements includes: mapping the first control channel to the M consecutively-numbered first transmission elements in descending order of numbers.

In this solution, mapping is performed in descending order (inverted order) of the numbers, so that not only the transmission element that has the largest number and that is used to transmit the control channel can be determined, but also efficiency in mapping the control channel by the network device can be improved.

Optionally, in a possible implementation of the first aspect, the mapping a first control channel to M consecutively-numbered first transmission elements includes: mapping the first control channel to the M consecutively-numbered first transmission elements in an order that mapping is performed in a number interleaving manner.

In this solution, a probability that the terminal device correctly identifies an occupied transmission element can be increased.

In a possible implementation of the first aspect, each of the M first transmission elements includes T groups of resource elements REs, and the mapping a first control channel to M first transmission elements includes: when mapping the first control channel, first occupying, by a network device, an $i^{th}$ group of REs in each of the M first transmission elements, and then occupying an $(i+1)^{th}$ group of REs in each first transmission element, where $T \geq 2$, and a value of i ranges from 1 to T.

In this solution, the network device performs mapping in this manner, so that manners of mapping one control channel to one or more transmission elements corresponding to different aggregation levels are different, and accordingly the terminal device can determine, through blind detection, a transmission element used to transmit the control channel. Further, this mapping manner allows one transmission element to include different encoded modulation symbols, to obtain a diversity gain.

In a possible implementation of the first aspect, the data channel is a downlink data channel; and a largest number of the M consecutively-numbered first transmission elements is k, a resource corresponding to the data channel includes at least one second transmission element, and a number corresponding to each of the at least one second transmission element is greater than k.

In this solution, the terminal device may determine, through blind detection, the transmission element that has the largest number and that is used to transmit the control channel, and determine that all transmission elements whose numbers are less than or equal to the largest number are used to transmit the control channel, thereby avoiding occurrence of a data rate matching error. Further, the at least one second transmission element whose number is greater than k can be used to transmit the downlink data channel, so that resource utilization can be improved.

In a possible implementation of the first aspect, a physical resource block PRB occupied by the resource corresponding to the data channel includes at least one transmission element whose number is less than k, and does not include the first transmission element whose number is k. In other words, the PRB occupied by the resource corresponding to the data channel does not include the first transmission element whose number is k, or the PRB occupied by the resource corresponding to the data channel and the first transmission element whose number is k do not overlap in frequency domain.

In this solution, a control channel of a terminal device is carried on a PRB different from that of a data channel of the terminal device when a transmission element included in the PRB on which the data channel of the terminal device is located is allowed to carry a control channel of another terminal device, so that scheduling flexibility is enhanced.

In a possible implementation of the first aspect, each of the M first transmission elements is located on N PRBs, N≥2, and locations of at least one of the M first transmission elements on at least two of the N PRBs are different.

In this solution, one first transmission element is located on a plurality of PRBs, so that when performing blind detection on one or more first transmission elements, the terminal device can perform channel estimation jointly by using the plurality of PRBs, thereby improving channel estimation performance.

In a possible implementation of the first aspect, the method further includes: sending a first DMRS to the terminal device, where the first DMRS is used to demodulate the first control channel.

In a possible implementation of the first aspect, the M first transmission elements are located in a symbol occupied by the first DMRS.

In this solution, the M first transmission elements are located only in the symbol occupied by the first DMRS, so that control channel designs in different sTTI lengths can be unified, thereby facilitating scheduling performed by the network device and blind detection performed by the terminal device. Further, the terminal device can obtain the first control channel when obtaining the first DMRS, so that efficiency in demodulating the first control channel by the terminal device based on the first DMRS can be improved.

In a possible implementation of the first aspect, the data channel is a downlink data channel; and the resource corresponding to the data channel includes at least one third transmission element, and an antenna port corresponding to the data channel includes an antenna port corresponding to each of the at least one third transmission element.

In this solution, whether a transmission element can be used to transmit a data channel is determined by using a relationship between antenna ports corresponding to the transmission element and antenna ports corresponding to the data channel (antenna ports corresponding to a transmission element included in a resource corresponding to a data channel is a subset or a universal set of antenna ports corresponding to the data channel), so that the terminal device tells which transmission elements among the transmission elements included in the resource corresponding to the data channel can be used to transmit the data channel, and accordingly signaling indication overheads can be reduced.

In a possible implementation of the first aspect, before the sending the first control channel to the terminal device, the method further includes: sending, to the terminal device, a second control channel and a second DMRS used to demodulate the second control channel, where a same antenna port and same precoding are used for the first control channel and the second control channel, so that the terminal device demodulates the first control channel based on the second DMRS and the first DMRS.

In this solution, the network device sends, to the same terminal device by using the same antenna port and same precoding, the first control channel and the second control channel that are in a same frequency but in different times, and the first DMRS and the second DMRS corresponding to the first control channel and the second control channel, so that the terminal device can perform channel estimation jointly by using the two DMRSs that are in different locations in time domain, thereby improving channel estimation performance.

Optionally, the network device determines that at least one fourth transmission element included in the resource corresponding to the data channel of the terminal device is used to transmit a third control channel of a second terminal device where the antenna port corresponding to the data channel of the terminal device is different from an antenna port corresponding to the third control channel, and there is one transmission layer for the data channel of the terminal device.

According to a second aspect, a control channel transmission method is provided. The method includes: receiving a first control channel sent by a network device, where the first control channel is mapped to M consecutively-numbered first transmission elements, the first control channel is used to schedule a data channel, a transmission element is a smallest unit used to transmit a control channel, and M≥1; and receiving or sending the data channel based on the first control channel.

In this solution, the network device maps a control channel to M consecutively-numbered transmission elements, so that a quantity of times a terminal device performs blind detection can be reduced, and blind detection complexity for the terminal device can be reduced.

In a possible implementation of the second aspect, an order for mapping the first control channel to the M consecutively-numbered first transmission elements is: first mapping the first control channel to a transmission element having a largest number in the M first transmission elements.

In this solution, demodulation can be correctly performed only when it is assumed that a control channel is first mapped to a transmission element having a largest number. In this way, the transmission element that has the largest number and that is used to transmit the control channel can be determined, and it can be determined that all transmission elements whose numbers are less than or equal to the largest number are used to transmit the control channel.

Optionally, in a possible implementation of the second aspect, a mapping manner for mapping the first control channel to the M first transmission elements is: performing mapping in descending order of numbers.

In this solution, mapping is performed in descending order (inverted order) of the numbers, so that not only a probability that the terminal device correctly identifies an occupied transmission element can be increased, but also a probability that the terminal device obtains the first control channel can be increased.

Optionally, in a possible implementation of the second aspect, the mapping the first control channel to M first transmission elements is performed in a number interleaving manner.

In this solution, a probability that the terminal device correctly identifies an occupied transmission element can be increased.

In a possible implementation of the second aspect, a manner of mapping the first control channel is: first occupying an $i^{th}$ group of REs in each of the M first transmission elements, and then occupying an $(i+1)^{th}$ group of REs in each first transmission element, where T≥2, and a value of i ranges from 1 to T.

In this solution, manners of mapping one control channel to one or more transmission elements corresponding to different aggregation levels are different, and the terminal device can determine, through blind detection, a transmission element used to transmit the control channel. Further, one transmission element can include different encoded modulation symbols, to obtain a diversity gain.

In a possible implementation of the second aspect, the data channel is a downlink data channel; and a largest number of the M consecutively-numbered first transmission elements is k, a resource corresponding to the data channel includes at least one second transmission element, and a number corresponding to each of the at least one second transmission element is greater than k.

In this solution, the terminal device may determine, through blind detection, the transmission element that has the largest number and that is used to transmit the control channel, and determine that all transmission elements whose numbers are less than or equal to the largest number are used to transmit the control channel, thereby avoiding occurrence of a data rate matching error.

In a possible implementation of the second aspect, a physical resource block PRB occupied by the resource corresponding to the data channel includes at least one transmission element whose number is less than k, and does not include the first transmission element whose number is k. The PRB occupied by the resource corresponding to the data channel does not include the first transmission element whose number is k. In other words, the PRB occupied by the resource corresponding to the data channel and the first transmission element whose number is k do not overlap in frequency domain.

In this solution, a control channel of a terminal device is carried on a PRB different from that of a data channel of the terminal device when a transmission element included in the PRB on which the data channel of the terminal device is located is allowed to carry a control channel of another terminal device, so that scheduling flexibility is enhanced.

In a possible implementation of the second aspect, each of the M first transmission elements is located on N PRBs, N≥2, and locations of at least one of the M first transmission elements on at least two of the N PRBs are different.

In this solution, one first transmission element is located on a plurality of PRBs, so that when performing blind detection on one or more first transmission elements, the terminal device can perform channel estimation jointly by using the plurality of PRBs, thereby improving channel estimation performance.

In a possible implementation of the second aspect, the method further includes: receiving a first DMRS sent by the network device, where the first DMRS is used to demodulate the first control channel.

In a possible implementation of the second aspect, the M first transmission elements are located in a symbol occupied by the first DMRS.

In this solution, the M first transmission elements are located only in the symbol occupied by the first DMRS, so that control channel designs in different sTTI lengths can be unified, thereby facilitating scheduling performed by the network device and blind detection performed by the terminal device. Further, the terminal device obtains the first control channel when obtaining the first DMRS, so that efficiency in demodulating the first control channel by the terminal device based on the first DMRS can be improved.

In a possible implementation of the second aspect, the data channel is a downlink data channel; and the resource corresponding to the data channel includes at least one third transmission element, and an antenna port corresponding to the data channel includes an antenna port corresponding to each of the at least one third transmission element.

In this solution, whether a transmission element can be used to transmit a data channel is determined by using a relationship between antenna ports corresponding to the transmission element and antenna ports corresponding to a data channel (antenna ports corresponding to a transmission element included in a resource corresponding to a data channel is a subset or a universal set of antenna ports corresponding to the data channel), so that the antenna ports corresponding to the transmission element included in the resource corresponding to the data channel is a subset or a universal set of the antenna ports corresponding to the data channel, and the terminal device can tell which transmission elements among the transmission element included in the resource corresponding to the data channel can be used to transmit the data channel.

In a possible implementation of the second aspect, before the receiving a first control channel sent by a network device, the method further includes: receiving a second control channel and a second DMRS used to demodulate the second control channel that are sent by the network device, where a same antenna port and same precoding are used for the first control channel and the second control channel; and the receiving a first control channel sent by a network device includes: demodulating the first control channel based on the second DMRS and the first DMRS.

In this solution, the terminal device performs channel estimation jointly by using the two DMRSs in different locations in time domain, so that channel estimation performance can be improved.

According to a third aspect, a network device is provided, and is configured to perform the method in any one of the first aspect and the possible implementations of the first aspect. Specifically, the network device includes modules configured to perform the method in any one of the first aspect and the possible implementations of the first aspect.

According to a fourth aspect, a terminal device is provided, and is configured to perform the method in any one of the second aspect and the possible implementations of the second aspect. Specifically, the terminal device includes modules configured to perform the method in any one of the second aspect and the possible implementations of the second aspect.

According to a fifth aspect, a network device is provided. The network device includes a processor, a transceiver, and a memory. Optionally, the network device further includes a bus system. The transceiver, the memory, and the processor are connected by using the bus system. The memory is configured to store an instruction. The processor is configured to execute the instruction stored in the memory, to control the transceiver to receive or send a signal, and when the processor executes the instruction stored in the memory, the processor performs the method in any one of the first aspect and the possible implementations of the first aspect.

According to a sixth aspect, a terminal device is provided. The terminal device includes a processor, a transceiver, and a memory. Optionally, the terminal device further includes a bus system. The transceiver, the memory, and the processor are connected by using the bus system. The memory is configured to store an instruction. The processor is configured to execute the instruction stored in the memory, to control the transceiver to receive or send a signal, and when the processor executes the instruction stored in the memory, the processor performs the method in any one of the second aspect and the possible implementations of the second aspect.

According to a seventh aspect, a computer storage medium is provided. The computer storage medium stores program code, and the program code is used to instruct to perform the method in any one of the first aspect and the possible implementations of the first aspect.

According to an eighth aspect, a computer storage medium is provided. The computer storage medium stores program code, and the program code is used to instruct to perform the method in any one of the second aspect and the possible implementations of the second aspect.

BRIEF DESCRIPTION OF THE DRAWINGS

To describe the technical solutions in the embodiments of the present invention more clearly, the following briefly describes the accompanying drawings required for describing the embodiments of the present invention. Apparently, the accompanying drawings in the following description show merely some embodiments of the present invention, and a person of ordinary skill in the art may still derive other drawings from these accompanying drawings without creative efforts.

DETAILED DESCRIPTION OF ILLUSTRATIVE EMBODIMENTS

Figure 1:
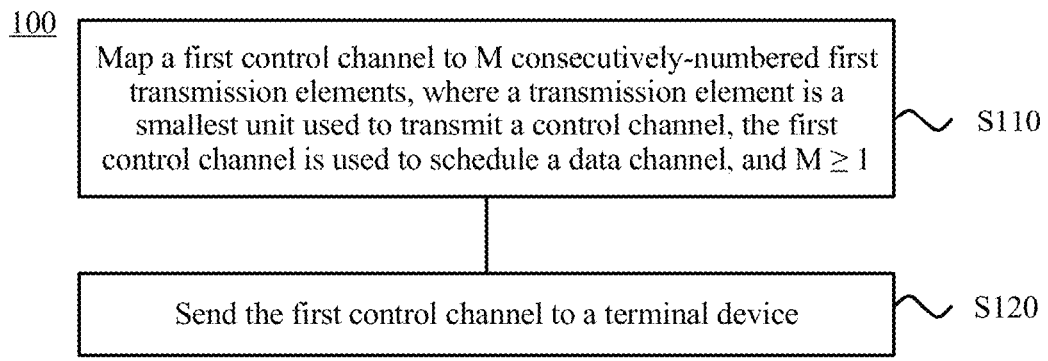
FIG. 1 is a schematic flowchart of a control channel transmission method according to an embodiment of the present invention.

The following clearly describes the technical solutions in the embodiments of the present invention with reference to the accompanying drawings in the embodiments of the present invention. Apparently, the described embodiments are some but not all of the embodiments of the present invention. All other embodiments obtained by a person of ordinary skill in the art based on the embodiments of the present invention without creative efforts shall fall within the protection scope of the present invention.

Terminologies such as "component", "module", and "system" used in this specification are used to indicate computer-related entities, hardware, firmware, combinations of hardware and software, software, or software being executed. For example, a component may be but is not limited to a process that runs on a processor, a processor, an object, an executable file, a thread of execution, a program, and/or a computer. Both a computing device and an application that runs on a computing device may be components illustrated in the drawings. F components may reside within a process and/or a thread of execution, and a component may be located on one computer and/or distributed across two or more computers. In addition, these components may be executed from various computer-readable mediums that store various data structures. The components may communicate by using a local and/or remote process and based on, for example, a signal having F data packets (for example, data from two components interacting with another component in a local system, a distributed system, and/or another network, for example, the Internet interacting with other systems by using signals).

The solutions of the embodiments of the present invention may be applied to an existing cellular communications system, for example, a Global System for Mobile Communications (GSM), a Code Division Multiple Access (CDMA) system, a Wideband Code Division Multiple Access (WCDMA) system, a General Packet Radio Service (GPRS) system, a Universal Mobile Telecommunications System (UMTS), or a Long Term Evolution (LTE) system, and is especially applied to a 4.5G evolved LTE system and a 5G wireless communications system. Supported communication is mainly voice and data communication. Usually, a conventional base station supports a limited quantity of connections, and is easy to implement.

The embodiments are described in the present invention with reference to a terminal device. The terminal device may also be referred to as user equipment (UE), an access terminal, a subscriber unit, a subscriber station, a mobile station, a mobile, a remote station, a remote terminal, a mobile device, a user terminal, a terminal, a wireless communications device, a user agent, or a user apparatus. The terminal device may be a station (ST) in a wireless local area network (WLAN), or may be a cellular phone, a cordless phone, a Session Initiation Protocol (SIP) phone, a wireless local loop (WLL) station, a personal digital assistant (PDA) device, a handheld device having a wireless communication function, a computing device or another processing device connected to a wireless modem, an in-vehicle device, a wearable device, a terminal device in a future 5G network or a terminal device in a future evolved PLMN network, or the like. This is not limited in the present invention.

In addition, the embodiments are described in the present invention with reference to a network device. The network device may be a device configured to communicate with a mobile device. The network device may be an access point (AP) in a WLAN or a base transceiver station (BTS) in GSM or Code Division Multiple Access (CDMA); may be a NodeB (NB) in WCDMA; or may be an evolved NodeB (eNB or eNodeB) in Long Term Evolution (LTE), a relay station or an access point, an in-vehicle device, a wearable device, a network device in a future 5G network or a network device in a future evolved PLMN network, or the like. This is not limited in the present invention.

It should be understood that the technical solutions of the embodiments of the present invention may be applied to various communications systems such as an LTE system or a 5G system, or may be applied to other communications systems in which a control channel needs to be transmitted.

It should be further understood that an uplink symbol is referred to as a single carrier frequency division multiple access (SC-FDMA) symbol, and a downlink symbol is referred to as an orthogonal frequency division multiplexing (OFDM) symbol. If an uplink multiple access mode of orthogonal frequency division multiple access (OFDMA) is introduced in evolution of a future 5G technology or an LTE technology, the uplink symbol may also be referred to as an OFDM symbol. In the embodiments of the present invention, uplink symbols and downlink symbols are collectively referred to as symbols. Alternatively, a symbol mentioned in the technical solutions of the embodiments of the present invention may be a symbol in another type of communication. This is not limited in the embodiments of the present invention.

The embodiments are described in the present invention with reference to a physical channel. The physical channel is specifically used to transmit data information and/or control information. In the embodiments of the present invention, the physical channel includes one or a combination of the following: a PUSCH (physical uplink shared channel), a PDCCH (physical downlink control channel), an EPDCCH (enhanced-physical downlink control channel), an MPDCCH (MTC physical downlink control channel), a PCFICH (physical control format indicator channel), a PHICH (physical hybrid ARQ indicator channel), a PDSCH (physical downlink shared channel), and the like; or may be a channel that is newly introduced in a standard and that has a same function but a different name, for example, a control channel or a data channel introduced in short TTI transmission.

The embodiments are described in the present invention with reference to a demodulation reference signal. A reference signal (RS) is used on a physical layer, and does not carry data information from a higher layer, for example, a cell-specific reference signal (CRS) used in a downlink, a UE-specific reference signal (UE-RS) used in a downlink, a group-specific reference signal (GRS) used in a downlink, a demodulation reference signal (DMRS) used in an uplink, or a sounding reference signal (SRS). The UE-RS used in a downlink is also referred to as a demodulation reference signal (DMRS) used in a downlink.

A downlink DMRS includes an EPDCCH DMRS used for EPDCCH demodulation and a PDSCH DMRS used for PDSCH demodulation. The terminal device may perform channel estimation based on a DMRS, and then demodulate a corresponding EPDCCH or PDSCH based on an estimated channel value, to obtain various data, information, signals, or the like carried on the EPDCCH or the PDSCH.

It should be understood that in an LTE system and an evolved LTE system, from a perspective of a time dimension, a time length of a subframe is 1 ms, and a normal cyclic prefix (NCP) subframe includes 14 symbols. From a perspective of a frequency dimension, a smallest unit is a subcarrier. A physical resource block (PRB) includes 12 subcarriers in frequency domain. A resource block group (RBG) may include an integer quantity of PRBs. From a perspective of both a time dimension and a frequency dimension, a smallest unit of a resource used for antenna port transmission is a resource element (RE). One RE includes one symbol in time domain, and one subcarrier in frequency domain. A resource-element group (REG) may include an integer quantity of REs.

It should be further understood that short transmission time interval (sTTI) transmission is transmission in a TTI whose length is less than one subframe or a TTI whose length is less than 1 ms. For example, an sTTI length is one symbol, two symbols, three symbols, four symbols, five symbols, six symbols, or seven symbols. Alternatively, symbols in one subframe are usually divided into an integer quantity of sTTIs, so that sTTI transmission does not cross a subframe boundary. To be specific, one subframe may include one type of symbol length. For example, an sTTI length is seven symbols, one subframe includes two sTTIs, and a length of each sTTI is seven symbols. Alternatively, one subframe may include a combination of a plurality of types of symbol lengths. For example, an sTTI length is two symbols, but considering that a PDCCH may occupy one to three symbols, one subframe includes six sTTIs, and lengths of the sTTIs are respectively three symbols, two symbols, two symbols, two symbols, two symbols, and three symbols; or considering that two symbols are usually configured for a PDCCH, lengths of the sTTIs are respectively two symbols, two symbols, three symbols, two symbols, two symbols, and three symbols, or another combination is used. A plurality of short TTIs having different lengths may exist in the system. For example, the system supports that 7-symbol sTTI transmission and 2-symbol sTTI transmission are performed in one subframe.

It should be further understood that a resource (for example, a first resource or a second resource) in the embodiments of the present invention may be a communications resource in a general sense. The resource may be a communications resource in two dimensions: time and frequency. In other words, the communications resource may include a time-domain resource and a frequency-domain resource. The resource may further include at least one of a code-domain resource and a space-domain resource.

Figure 2:
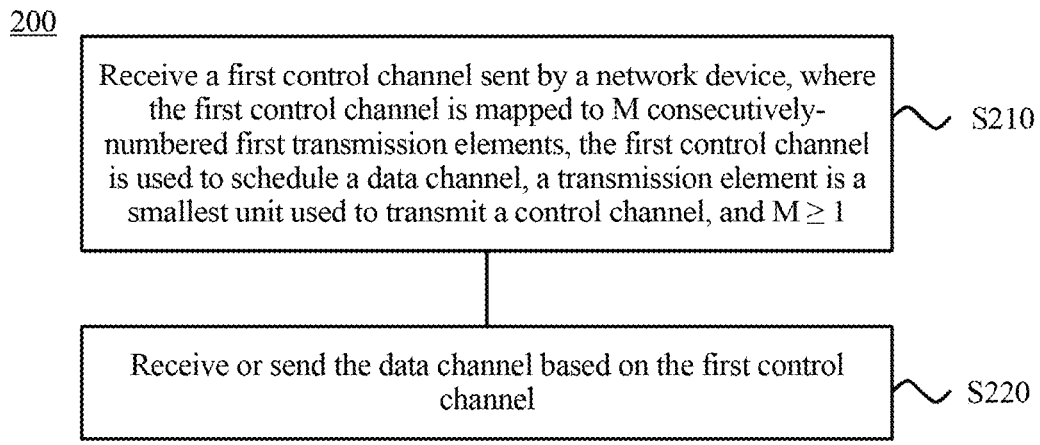
FIG. 2 is another schematic flowchart of a control channel transmission method according to an embodiment of the present invention.

The following describes in detail a control channel transmission method in the embodiments of the present invention with reference to FIG. 1 and FIG. 2.

FIG. 1 is a schematic flowchart of a control channel transmission method according to an embodiment of the present invention. FIG. 1 shows steps or operations of a control channel transmission method 100, but the steps or operations are merely an example, and other operations or variants of the operations in FIG. 1 may alternatively be performed in this embodiment of the present invention. In addition, the steps in FIG. 1 may be performed in an order different from that shown in FIG. 1, and possibly, not all the operations in FIG. 1 need to be performed. The control channel transmission method 100 may include the following steps.

S110. Map a first control channel to M consecutively-numbered first transmission elements, where a transmission element is a smallest unit used to transmit a control channel, the first control channel is used to schedule a data channel, and M≥1.

It should be understood that the first control channel may transmit any one of at least three types of downlink control information (DCI): scheduling information for downlink data transmission (used to receive a downlink data channel), scheduling information for uplink data transmission (used to schedule uplink data channel sending), and an uplink power control command (used to indicate uplink power control and adjustment).

S120. Send the first control channel to a terminal device.

FIG. 2 is another schematic flowchart of a control channel transmission method according to an embodiment of the present invention. FIG. 2 shows steps or operations of a control channel transmission method 200, but the steps or operations are merely an example, and other operations or variants of the operations in FIG. 2 may alternatively be performed in this embodiment of the present invention. In addition, the steps in FIG. 2 may be performed in an order different from that shown in FIG. 2, and possibly, not all the operations in FIG. 2 need to be performed. The control channel transmission method 200 may include the following steps.

S210. Receive a first control channel sent by a network device, where the first control channel is mapped to M consecutively-numbered first transmission elements, the first control channel is used to schedule a data channel, a transmission element is a smallest unit used to transmit a control channel, and M≥1.

S220. Receive or send the data channel based on the first control channel.

Specifically, before sending the first control channel, the network device may determine a resource used to transmit the first control channel. To be specific, the M first transmission elements are used to transmit the first control channel. After mapping the first control channel to the M first transmission elements, the network device may send the first control channel by using the M first transmission elements. A terminal device receives the first control channel sent by the network device. The first control channel may include at least the following two cases:

(1) If the first control channel is a DL grant, the method 100 further includes: sending the data channel to the terminal device; and the method 200 further includes: receiving the data channel sent by the network device.

(2) If the first control channel is a UL grant, the method 200 further includes: sending the data channel to the network device; and the method 100 further includes: receiving the data channel sent by the terminal device.

In the methods provided in the embodiments of the present invention, when sending the first control channel, the network device first maps the first control channel to the M consecutively-numbered first transmission elements, so that a quantity of times the terminal device performs blind detection can be reduced, and therefore blind detection complexity for the terminal device is reduced.

It should be noted that a concept of transmission element (for example, the first transmission element and a second transmission element and a third transmission element that are disclosed later) is introduced in the embodiments of the present invention. The transmission element (TE) is a smallest unit used to transmit a control channel, and one control channel may be transmitted by using an integer quantity of transmission elements. Specifically, a transmission element may be a CCE (control channel element) that is used in an LTE system to transmit a PDCCH, or may be an ECCE (enhanced control channel element) that is used in an LTE system to transmit an EPDCCH or an MPDCCH, or may be one of a PRB, an RBG, or a REG, or may be a smallest unit that is used to transmit a control channel and that is introduced in sTTI transmission, or a smallest unit that is used to transmit a control channel and that is introduced in a future 5G system. This is not limited in the present invention.

For ease of understanding and description, the following describes the embodiments of the present invention by using sending and reception of a control channel (an sPDCCH) and/or a data channel (an sPDSCH) in sTTI transmission as an example.

1. Determining of an sPDCCH Region.

Optionally, the network device determines a frequency-domain resource occupied by a transmission element that can be used to send an sPDCCH and that is within one sTTI. Specifically, the frequency-domain resource is a PRB or an RBG.

It should be noted that a service supporting transmission in a plurality of sTTIs having different lengths may exist in a system. Optionally, a same design may be used for sPDCCHs corresponding to the sTTIs having different lengths. A 2-symbol sTTI and a 7-symbol sTTI are used as an example. A resource that can be used for an sPDCCH in time domain is restricted by a length of the 2-symbol sTTI. To be specific, an sPDCCH corresponding to the 2-symbol sTTI and that corresponding to the 7-symbol sTTI may both occupy a maximum of 2 symbols in time domain, so that transmission manners of the sPDCCHs in the sTTIs having the two lengths are the same. Because a terminal device supporting transmission in sTTIs having different lengths may exist in the system, using a same design for sPDCCHs corresponding to the sTTIs having different lengths facilitates scheduling performed by the network device and blind detection performed by the terminal device.

In the embodiments of the present invention, an sPDCCH design is described by using an example in which one symbol is occupied or two symbols are occupied, but the present invention is not limited thereto.

Figure 3:
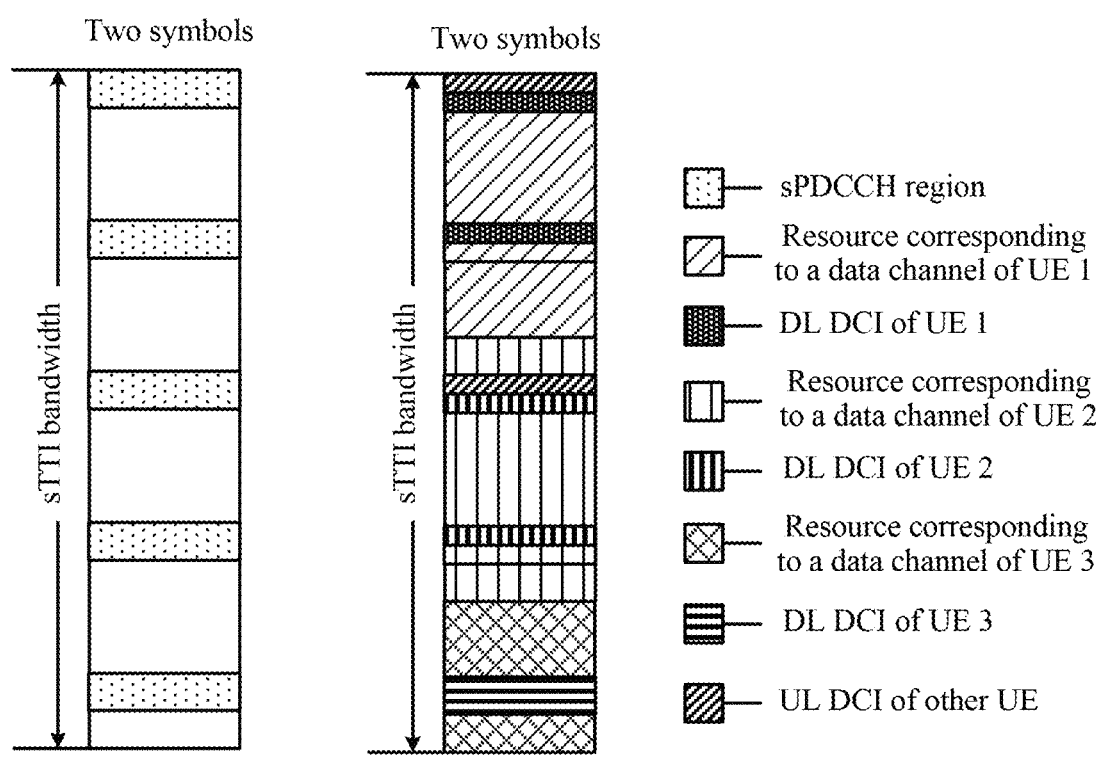
FIG. 3 is a schematic diagram of an example of control channel resource allocation according to an embodiment of the present invention.

Optionally, the frequency-domain resource occupied by the transmission element that can be used to send an sPDCCH and that is within one sTTI is a positive integer quantity of RBGs. One RBG includes one or more PRBs. FIG. 3 is a schematic diagram of an example of control channel resource allocation according to an embodiment of the present invention. Specifically, FIG. 3 is a schematic diagram of a plurality of RBGs occupied by transmission elements that can be used to send an sPDCCH and that are in a 2-symbol sTTI. As shown in FIG. 3, the transmission elements are located in bandwidth in which the sTTI is located, occupy two symbols in time, and occupy five RBGs in frequency domain. Each RBG may include one or more transmission elements. Optionally, the terminal device may be informed of locations of the five RBGs in a predefined manner or through signaling notification of the network device.

Optionally, the network device determines that an sPDCCH used to schedule sTTI downlink data reception in an sTTI is located on transmission elements included in a PRB on which an sPDSCH corresponding to the sPDCCH is located. In an sTTI transmission process, to improve resource utilization efficiency, a transmission element that is not used to send the sPDCCH and that is in the transmission elements included in the PRB on which the sPDSCH is located may be used for data channel transmission in the sTTI.

In a specific scheduling process, optionally, the network device and the terminal device may agree on that a control channel occupies transmission elements in ascending order of numbers. If there is only a DL grant in the system, the network device maps an sPDCCH of a terminal device to transmission elements included in a PRB on which an sPDSCH of the terminal device is located. If there are both a DL grant and a UL grant in the system, the network device uses, to transmit the UL grant, transmission elements having relatively small numbers in transmission elements included in the PRB on which the sPDSCH of the terminal device is located, and maps the DL grant after mapping the UL grant. The UL grant and the DL grant both occupy consecutively-numbered transmission elements. An advantage of doing so is as follows: After detecting the sPDCCH, the terminal device can know a largest number of transmission elements occupied by the sPDCCH, and determine, based on the largest number, that transmission elements whose number is less than or equal to the largest number in the transmission elements included in the PRB on which the sPDSCH is located are already used to transmit the sPDCCH, to determine that a transmission element whose number is greater than the largest number in the transmission elements included in the PRB on which the sPDSCH is located is used for data transmission.

2. Manner in Which the Terminal Device Detects an sPDCCH.

Optionally, the network device determines at least one type of information such as a time-domain resource occupied by transmission elements that can be used to send an sPDCCH and that are within one sTTI, a frequency-domain resource occupied by the transmission elements, a quantity of the transmission elements, numbers of the transmission elements, a physical resource corresponding to the transmission elements, a search space of the terminal device, and an aggregation level used by the terminal device to search for an sPDCCH; and notifies the terminal device of the foregoing information in a predefined manner or through signaling notification. Further, optionally, the network device may notify the terminal device of the foregoing information by using RRC signaling or physical layer signaling. It should be noted that, to improve resource utilization, the network device may use a transmission element that is not used for sPDCCH transmission, to transmit a data channel, a reference signal, or other information.

Optionally, the network device may send sPDCCHs of different terminal devices to the corresponding terminal devices on transmission elements in one sTTI. A plurality of sPDCCHs are multiplexed to form an entire search space. The terminal device performs blind detection on all possible sPDCCHs in the entire search space or the search space of the terminal device to determine whether there is an sPDCCH sent by the network device to the terminal device. To reduce a quantity of times the terminal device performs blind detection on the sPDCCHs, an sPDCCH sent by the network device to the terminal device is carried on M consecutively-numbered transmission elements, where M is a positive integer. To further reduce the quantity of times the terminal device performs blind detection, the network device may limit a value range of M, that is, an sPDCCH aggregation level, and use a tree-like aggregation manner. For example, the value range of M is 1, 2, 4, and 8. In other words, the aggregation level is 1, 2, 4, or 8. One sPDCCH can be transmitted only by using one transmission element, two transmission elements, four transmission elements, or eight transmission elements. Transmission of an sPDCCH transmitted by using one transmission element may start from a transmission element in any location. Transmission of an sPDCCH transmitted by using two transmission elements starts from an even-numbered transmission element. Transmission of an sPDCCH transmitted by using four transmission elements starts from a transmission element numbered an integer multiple of 4. Transmission of an sPDCCH transmitted by using eight transmission elements starts from a transmission element numbered an integer multiple of 8.

Optionally, the terminal device may receive, in the following manner, a first sPDCCH sent by the network device: The terminal device performs blind detection on sPDCCHs in a search space notified by the network device or on the transmission elements that can be used to send an sPDCCH and that are within one sTTI. The terminal device performs detection based on a possible aggregation level supported by the system or an aggregation level notified by the network device. For example, a size of the search space is eight transmission elements, and an sPDCCH aggregation level may be 1, 2, 4, or 8. The eight transmission elements are numbered from 0 to 7. During blind detection, the terminal device first assumes that one sPDCCH is mapped to one transmission element, and performs detection on all the transmission elements numbered 0 to 7, to determine whether there is an sPDCCH of the terminal device. In this case, detection is performed eight times in total. If no sPDCCH of the terminal device is detected, it is then assumed that one sPDCCH is mapped to two transmission elements. Detection is performed on the transmission elements 0 and 1 to determine whether there is an sPDCCH of the terminal device. If no sPDCCH of the terminal device is detected, detection is the performed on the transmission elements 2 and 3, and so on. If no sPDCCH of the terminal device is detected when detection is performed based on two transmission elements, the terminal device then assumes that one sPDCCH is mapped to four transmission elements, and separately performs detection on the transmission elements 0, 1, 2, and 3 and the transmission elements 4, 5, 6, and 7 to determine whether there is an sPDCCH of the terminal device. If no sPDCCH of the terminal device is detected, the terminal device assumes that one sPDCCH is mapped to eight transmission elements, and performs detection on the transmission elements 0, 1, 2, 3, 4, 5, 6, and 7 to determine whether there is an sPDCCH of the terminal device. If no sPDCCH of the terminal device is detected after the entire search space is searched, the terminal device considers that the network device has not scheduled the terminal device in the sTTI. If an sPDCCH of the terminal device is detected in a search process, the terminal device may stop searching, and receive downlink data or send uplink data based on content of the sPDCCH.

3. Correspondence Between Transmission Elements and Physical Resources.

Optionally, the network device numbers all transmission elements in an sPDCCH region in one sTTI. Specifically, the transmission elements are in a one-to-one correspondence with numbers, and the numbers are arranged in ascending order. For example, assuming that an sPDCCH region in one sTTI includes 10 transmission elements, the network device may number the 10 transmission elements from 0 to 9.

Figure 4A:
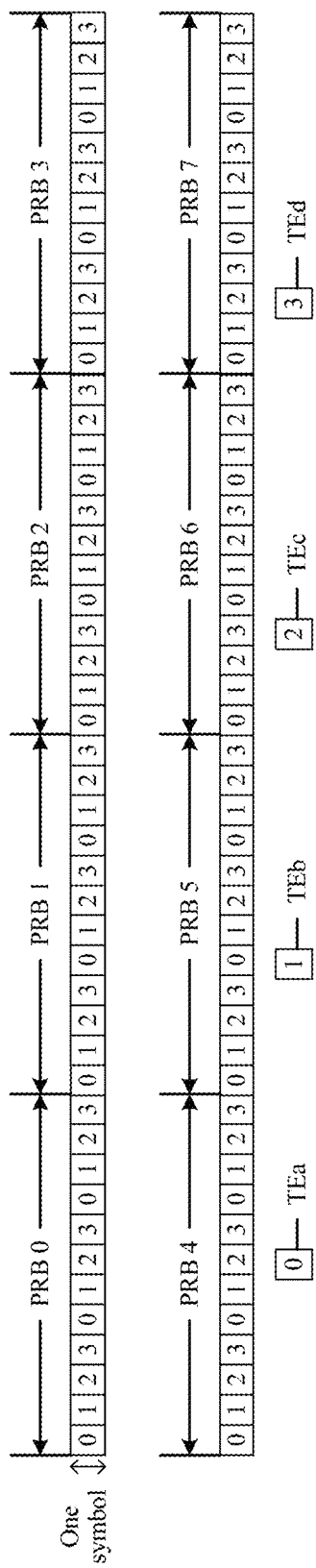
FIG. 4a is a schematic diagram of another example of a resource mapping diagram according to an embodiment of the present invention.

It should be noted that the transmission elements are in a one-to-one correspondence with physical resources. Optionally, in the embodiments of the present invention, one RBG in the sPDCCH region includes N PRBs, where N is a positive integer; and the N PRBs include P transmission elements, where P is a positive integer. Optionally, each of the P transmission elements is located on the N PRBs, and each transmission element occupies T REs in one PRB, where T is a positive integer. If $i^{th}$ REs occupied by each transmission element in the N PRBs are considered as an $i^{th}$ REG, it may be considered that each transmission element includes T REGs, and each REG includes N REs. Descriptions are provided below by using an example in which one RBG includes eight PRBs, and the eight PRBs include four transmission elements. FIG. 4a is a schematic diagram of an example of a resource mapping diagram according to an embodiment of the present invention. Further, FIG. 4a is specifically a schematic diagram in which transmission elements included in one RBG in one symbol are mapped to physical resources. As shown in FIG. 4a, a size of the RBG is eight PRBs, including four transmission elements that are respectively a TEa, a TEb, a TEc, and a TEd. Each of the four transmission elements is located on the eight PRBs, and each transmission element occupies three REs in one PRB. If $i^{th}$ REs occupied by each transmission element in a plurality of PRBs are considered as one REG, it may be considered that each transmission element includes three REGs, and each REG includes eight REs.

Figure 4B:
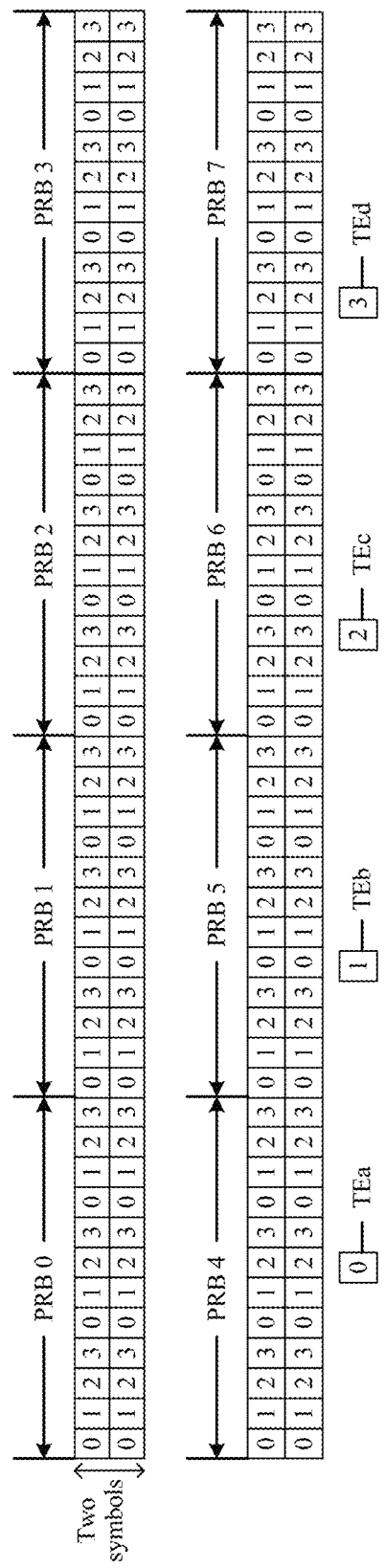
FIG. 4b is a schematic diagram of still another example of a resource mapping diagram according to an embodiment of the present invention.

FIG. 4b is a schematic diagram of another example of a resource mapping diagram according to an embodiment of the present invention. Further, FIG. 4b is specifically a schematic diagram in which transmission elements included in one RBG in two symbols are mapped to physical resources. As shown in FIG. 4b, a size of the RBG is eight PRBs, including four transmission elements that are respectively a TEa, a TEb, a TEc, and a TEd. Each of the four transmission elements is located on the eight PRBs, and each transmission element occupies six REs in one PRB. If $i^{th}$ REs occupied by each transmission element in a plurality of PRBs are considered as one REG, it may be considered that each transmission element includes six REGs, and each REG includes eight REs. Alternatively, REs that are occupied by each transmission element and that are located in $i^{th}$ subcarriers in a plurality of PRBs may be considered as one REG. Therefore, it may be considered that each transmission element includes three REGs, and each REG includes 24 REs.

A correspondence is established between one transmission element and physical resources on a plurality of PRBs, so that the terminal device can perform channel estimation jointly by using the plurality of PRBs when performing blind detection for an sPDCCH, to improve channel estimation performance.

Figure 4C:
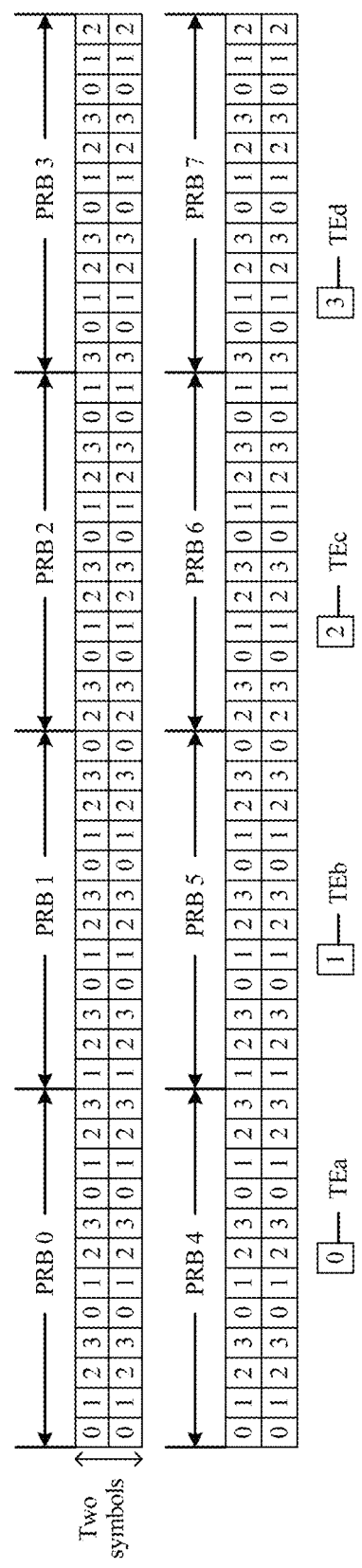
FIG. 4c is a schematic diagram of yet another example of a resource mapping diagram according to an embodiment of the present invention.

Further, optionally, when N is greater than or equal to 2, locations of at least one of the P transmission elements on at least two of the N PRBs may be different. FIG. 4c is a schematic diagram of still another example of a resource mapping diagram according to an embodiment of the present invention. Further, FIG. 4c is specifically a schematic diagram in which transmission elements included in one RBG in two symbols are mapped to physical resources. As shown in FIG. 4c, a size of the RBG is eight PRBs, including four transmission elements that are respectively a TEa, a TEb, a TEc, and a TEd. Each of the four transmission elements is located on the eight PRBs, each transmission element occupies six REs in one PRB, and locations of at least one transmission element on at least two of the eight PRBs are different. As shown in the figure, a $1^{st}$ RE occupied by the TEa in a PRB 0 is located in a $1^{st}$ subcarrier in the PRB 0, and a first RE occupied by the TEa in a PRB 1 is located in a $4^{th}$ subcarrier in the PRB 1. In other words, locations of the TEa on the PRB 0 and the PRB 1 are different. If $i^{th}$ REs occupied by each transmission element in a plurality of PRBs are considered as one REG, it may be considered that each transmission element includes six REGs, and each REG includes eight REs. Alternatively, REs that are occupied by each transmission element and that are located in $i^{th}$ subcarriers in a plurality of PRBs may be considered as one REG. Therefore, it may be considered that each transmission element includes three REGs, and each REG includes 24 REs.

If a reference signal needs to be sent in the RBG, because the reference signal is in a same location in each PRB and occupies a same quantity of REs in each PRB, the reference signal occupies similar quantities of resources in the transmission elements in the RBG by using such resource mapping, to ensure balance between quantities of resources that can be used to transmit DCI or data and that are occupied by the transmission elements.

4. Mapping Manners for Mapping a Control Channel to Physical Resources Corresponding to Transmission Elements.

Optionally, in an example, the network device maps the first control channel to the M first transmission elements. Specifically, the network device may first determine the M first transmission elements, or determine that a quantity of transmission elements used to transmit a control channel is M. Specifically, manners for mapping the first control channel to the M first transmission elements are as follows:

Mapping Manner 1: Sequential Mapping.

Specifically, the network device may map the first control channel to the M first transmission elements in ascending order of numbers of the transmission elements.

For example, it is assumed that the first control channel is mapped to four first transmission elements, and numbers of the four first transmission elements are respectively 0, 1, 2, and 3. An order in which the network device maps the first control channel to the four first transmission elements is: first mapping the first control channel to the transmission element 0, then to the transmission element 1, then to the transmission element 2, and finally to the transmission element 3.

It should be noted that when the network device maps the first control channel in the mapping manner 1, in some circumstances, although the first control channel is mapped to the M first transmission elements, the terminal device may obtain the first control channel by using only M-G transmission elements. Consequently, the terminal device considers by mistake that the first control channel is mapped to the M-G transmission elements, and an error may occur in processing of the terminal device (G≥1).

For example, it is assumed that the first control channel is mapped to the transmission elements 0, 1, 2, and 3. During blind detection, the terminal device may correctly receive the first control channel by using only the transmission elements 0 and 1, and consequently consider by mistake that the first control channel occupies only resources on the transmission elements 0 and 1. In this case, the terminal device considers that the transmission elements 2 and 3 are not used to transmit the first control channel, and further considers that the transmission elements 2 and 3 are used to transmit a data channel. Consequently, the terminal device performs incorrect rate matching processing on the data channel. To avoid this phenomenon, the network device may use the following several mapping manners.

Mapping manner 2: First Mapping to a Transmission Element Having a Largest Number in the M First Transmission Elements.

Specifically, in the mapping manner 2, when mapping a control channel to the M first transmission elements, the network device first maps the control channel to a first transmission element having a largest number, and an order for mapping the control channel to transmission elements other than the first transmission element having the largest number in the M first transmission elements is not limited in the embodiments of the present invention.

For example, it is assumed that the first control channel is mapped to transmission elements 0, 1, 2, and 3. Specifically, an order in which the network device maps the first control channel to the four first transmission elements is: first mapping the first control channel to the transmission element 3, and then mapping the first control channel to the transmission elements 1, 2, and 0. During blind detection, the terminal device can correctly demodulate the first control channel only when it is assumed that the first control channel is first mapped to the transmission element 3. Therefore, after correctly demodulating the first control channel, the terminal device may determine that the transmission element 3 is occupied, and further determine that only a transmission element whose number is greater than 3 can be used for data transmission. In this way, a phenomenon of a data rate matching error does not occur.

In the mapping manner 2, in a given aggregation level, the network device first maps the control channel to the transmission element having the largest number, and during blind detection, the terminal device can correctly perform demodulation only when it is assumed that the control channel is first mapped to the transmission element having the largest number, so that the terminal device can determine the transmission element that has the largest number and that is used to transmit the control channel, and determine that all transmission elements whose numbers are less than or equal to the largest number are used to transmit the control channel, thereby avoiding occurrence of a data rate matching error.

Mapping Manner 3: Inverted-Order Mapping.

Specifically, the mapping manner 3 is a further limitation based on the mapping manner 2. In the mapping manner 3, the network device may map the first control channel to the M first transmission elements in descending order of numbers of the transmission elements.

For example, it is assumed that the first control channel is mapped to four first transmission elements, and numbers of the four first transmission elements are respectively 0, 1, 2, and 3. An order in which the network device maps the first control channel to the four first transmission elements is: first mapping the first control channel to the transmission element 3, then to the transmission element 2, then to the transmission element 1, and finally to the transmission element 0.

Compared with the mapping manner 2, in the mapping manner 3, efficiency in mapping the first control channel by the network device can be improved. A reason is as follows: The mapping manner 3 is similar to the mapping manner 1, and the network device maps the first control channel to the M first transmission elements in descending order of the numbers of the transmission elements. When a control channel is mapped in the mapping manner 3, not only occurrence of a data rate matching error can be avoided, but also efficiency in mapping the control channel by the network device can be improved.

Mapping Manner 4: Interleaved Mapping.

Specifically, in the mapping manner 4, the network device may map the first control channel to the M first transmission elements by interleaving numbers of the transmission elements.

For example, it is assumed that the first control channel is mapped to four first transmission elements, and numbers of the four first transmission elements are respectively 0, 1, 2, and 3. An order in which the network device maps the first control channel to the four first transmission elements is: first mapping the first control channel to the transmission element 0, then to the transmission element 2, then to the transmission element 1, and finally to the transmission element 3. In this case, during blind detection, the terminal device cannot correctly demodulate the first control channel based on only the transmission elements 0 and 1 or only the transmission elements 2 and 3, thereby avoiding occurrence of a data rate matching error.

Therefore, using the mapping manners 2, 3, and 4 in the embodiments of the present invention enables the terminal device to correctly determine the transmission element that has the largest number and that is used to transmit the control channel, and determine that all transmission elements whose numbers are less than or equal to the largest number are used to transmit the control channel, thereby avoiding occurrence of a data rate matching error.

In the foregoing four manners, an order or a rule in which the network device maps the first control channel to the M first transmission elements based on the numbers of the transmission elements is described from a perspective of mapping the control channel to the transmission elements. After the mapping order is determined, the first control channel needs to be mapped to physical resources corresponding to the M first transmission elements. The following specifically describes a manner in which the network device maps the first control channel to the resources corresponding to the M first transmission elements.

Optionally, in the embodiments of the present invention, the network device may map, in an interleaved manner, the first control channel to the resources corresponding to the M first transmission elements. Specifically, it is assumed that each of the M first transmission elements includes T groups of resource elements REs. When mapping the first control channel, the network device first occupies an $i^{th}$ group of REs in each of the M first transmission elements, and then occupies an $(i+1)^{th}$ group of REs in each first transmission element, where T≥2, and a value of i ranges from 1 to T.

A description is provided below with reference to a structure, shown in FIG. 4a, of mapping transmission elements to physical resources.

Figure 5A:
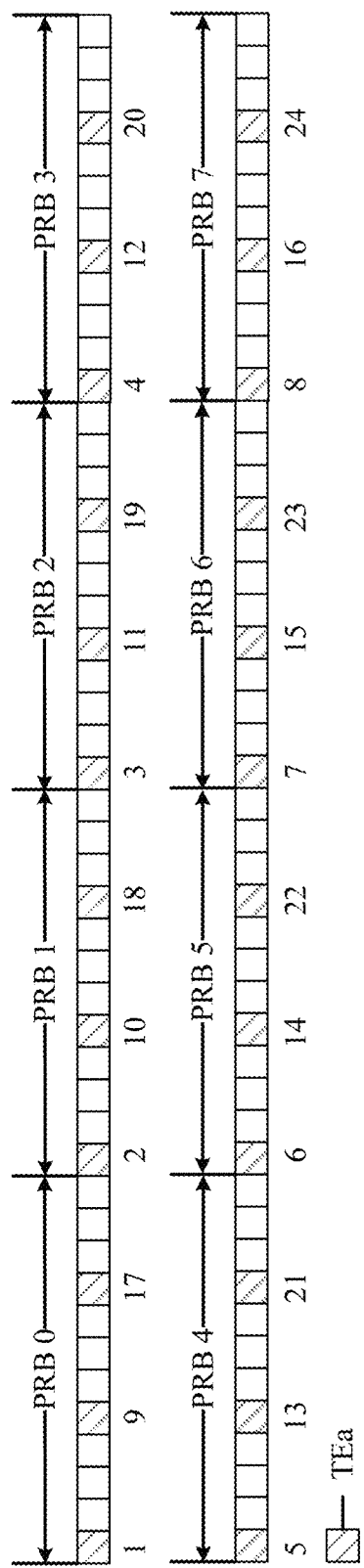
FIG. 5a is a schematic diagram of yet another example of a resource mapping diagram according to an embodiment of the present invention.

It is assumed that M is 1. To be specific, the network device needs to map the control channel to one transmission element. FIG. 5a is a schematic diagram of yet another example of a resource mapping diagram according to an embodiment of the present invention. Specifically, FIG. 5a is a schematic diagram in which the control channel is mapped to one transmission element. It is assumed that the network device maps the first control channel to a transmission element TEa. When mapping the first control channel, the network device first occupies a first RE of the TEa in each PRB, then occupies a second RE of the TEa in each PRB, and so on, until all REs included in the TEa are occupied. In FIG. 5a, numbers of the REs indicate an order in which the control channel occupies the REs in the transmission element TEa.

Figure 5B:
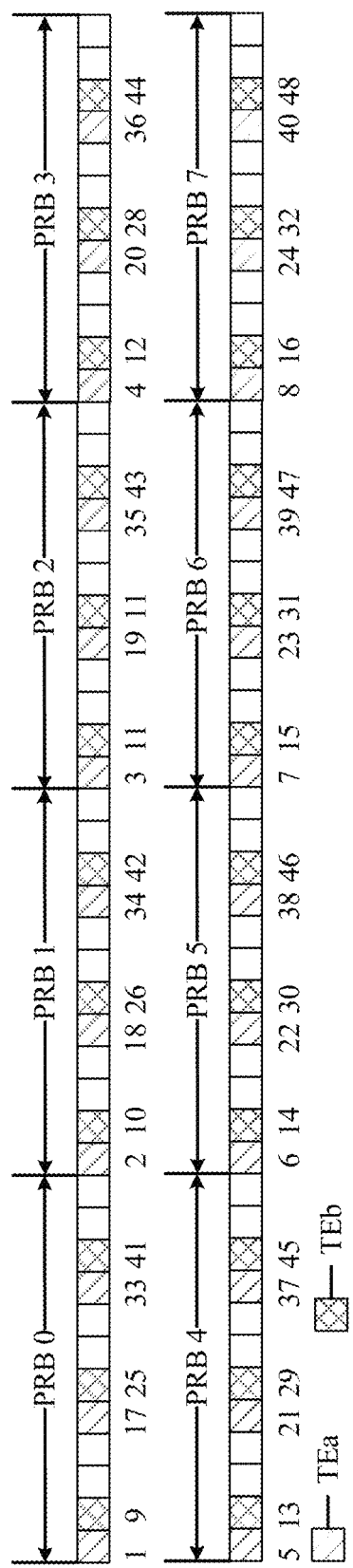
FIG. 5b is a schematic diagram of yet another example of a resource mapping diagram according to an embodiment of the present invention.

It is assumed that M is 2. To be specific, the network device needs to map the control channel to two transmission elements. FIG. 5b is a schematic diagram of yet another example of a resource mapping diagram according to an embodiment of the present invention. Specifically, FIG. 5b is a schematic diagram in which the control channel is mapped to two transmission elements. It is assumed that the network device maps the first control channel to transmission elements TEa and TEb. When mapping the first control channel, the network device sequentially occupies a first RE of the TEa in each PRB, a first RE of the TEb in each PRB, a second RE of the TEa in each PRB, a second RE of the TEb in each PRB, and so on, until all REs included in the TEa and the TEb are occupied. In FIG. 5b, numbers of the REs indicate an order in which the control channel occupies the REs in the transmission elements TEa and TEb.

Figure 5C:
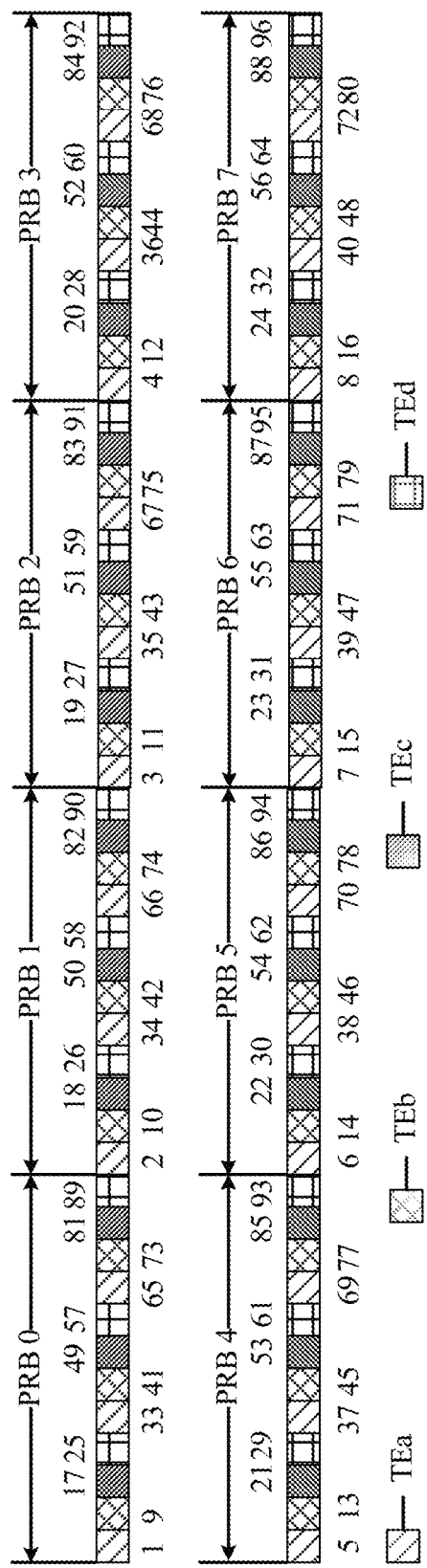
FIG. 5c is a schematic diagram of yet another example of a resource mapping diagram according to an embodiment of the present invention.

It is assumed that M is 4. To be specific, the network device needs to map the control channel to four transmission elements. FIG. 5c is a schematic diagram of yet another example of a resource mapping diagram according to an embodiment of the present invention. Specifically, FIG. 5c is a schematic diagram in which the control channel is mapped to four transmission elements. It is assumed that the network device maps the first control channel to transmission elements TEa, TEb, TEc, and TEd. When mapping the first control channel, the network device sequentially occupies a first RE of the TEa in each PRB, a first RE of the TEb in each PRB, a first RE of the TEc in each PRB, a first RE of the TEd in each PRB, a second RE of the TEa in each PRB, a second RE of the TEb in each PRB, a second RE of the TEc in each PRB, a second RE of the TEd in each PRB, and so on, until all REs included in the TEa, the TEb, the TEc, and the TEd are occupied. In FIG. 5c, numbers of the REs indicate an order in which the control channel occupies the REs in the transmission elements TEa, TEb, TEc, and TEd.

Mapping manners for structures shown in FIG. 4b and FIG. 4c are similar to that for FIG. 4a, and details are not described herein. It should be noted that when a transmission element includes two symbols, an order for mapping an $i^{th}$ group of REs and an $(i+1)^{th}$ group of REs in the transmission element may be time domain first frequency domain second, or frequency domain first time domain second. This is not limited in the present invention.

The network device performs mapping in this manner, so that manners of mapping one control channel to one or more transmission elements corresponding to different aggregation levels are different, and accordingly the terminal device can determine, through blind detection, a transmission element used to transmit the control channel.

It should be noted that the methods may be combined with any one of the four mapping manners for mapping a control channel to transmission elements. For example, it is assumed that M=4. If the network device performs mapping in a normal order of numbers, in FIG. 4a, the TEa is a transmission element 0, the TEb is a transmission element 1, the TEc is a transmission element 2, and the TEd is a transmission element 3. If the network device performs mapping in an inverted order of numbers, in FIG. 4a, the TEa is a transmission element 3, the TEb is a transmission element 2, the TEc is a transmission element 1, and the TEd is a transmission element 0.

It should be further noted that combining the mapping manner 1 with this method also enables the terminal device to determine, through blind detection, the transmission element used to transmit the control channel.

In addition, in the method in the embodiments of the present invention, interleaving is performed when the control channel is mapped to REs in a transmission element, so that one transmission element can include different encoded modulation symbols, to obtain a diversity gain.

5. Implicit Indication that an Unoccupied Transmission Element is Used for sPDSCH Transmission.

The foregoing describes that the network device maps the first control channel to the M first transmission elements. If the first control channel is used to schedule downlink data sending, to be specific, the network device sends both the first control channel and a data channel, when the data channel includes F (F≥1) transmission elements, a transmission element that is not occupied by the control channel and that is in the F transmission elements is used to transmit the downlink data channel. In the prior aft, a network device indicates, by sending signaling to a terminal device, a transmission element that is used to transmit a downlink data channel and that is in a resource corresponding to the data channel, and consequently signaling overheads are relatively high.

To resolve the foregoing problem, the network device may implicitly indicate, by using the first transmission element occupied by the first control channel, a specific transmission element that is used to transmit the data channel and that is in the F transmission elements included in a data region of the terminal device (it should be noted that the data region of the terminal device may be a resource corresponding to the data channel of the terminal device, that is, a PRB on which the data channel of the terminal device is located), so that signaling overheads can be reduced. The following describes in detail several manners in which the network device implicitly notifies the terminal device.

In an optional embodiment, the network device may implicitly notify, by using the numbers (or the largest number) of the M first transmission elements, the terminal device whether an $f^{th}$ transmission element in the F transmission elements included in the PRB on which the data channel is located can be used to transmit the data channel, where f=1, . . . , F.

It should be noted that the M first transmission elements in the embodiments of the present invention are transmission elements used to transmit the first control channel, the F transmission elements are transmission elements included in a resource corresponding to the downlink data channel of the terminal device, and the F transmission elements and the M first transmission elements may include same transmission elements, or may include different transmission elements.

Specifically, transmission elements are in a one-to-one correspondence with numbers. To be specific, the M first transmission elements are in a one-to-one correspondence with M numbers, and the F transmission elements are in a one-to-one correspondence with F numbers. If a number of a first transmission element A in the M first transmission elements is the same as a number of a transmission element B in the F transmission elements, it indicates that the first transmission element A and the transmission element B are a same transmission element. The network device and the terminal device may agree on that a control channel occupies transmission elements in ascending order of numbers. For example, assuming that the M numbers corresponding to the first control channel include a number S, it may indicate that transmission elements numbered 1 to S in the F transmission elements are occupied. Therefore, when it is assumed that a largest number in the M numbers corresponding to the M first transmission elements is k, the following several cases may be included.

(1) That numbers of a transmission elements in the F transmission elements are less than k may indicate that all of the a transmission elements have been occupied by the first control channel (or possibly another control channel, for example, a control channel of other user equipment). Therefore, none of the a transmission elements is used to transmit a data channel, where a≥0.

(2) That a number of a transmission element C in the F transmission elements is equal to k may indicate that the transmission element C has been occupied by the first control channel. Therefore, the transmission element C is not used to transmit a data channel.

(3) A number of at least one of the F transmission elements is greater than k, the transmission element whose number is greater than k in the F transmission elements is a second transmission element, and each of the at least one second transmission element may be used to transmit a data channel.

Therefore, after receiving the first control channel, the terminal device may determine, based on the numbers (or the largest number) of the M first transmission elements corresponding to the first control channel, that at least one second transmission element whose number is greater than the number k in the F transmission elements may be used to transmit the data channel, so that the terminal device can correctly receive the data channel, thereby avoiding occurrence of a data rate matching error. This solution is simple and easy to operate, reducing signaling overheads and improving resource utilization.

It should be noted that "the first transmission element", "the second transmission element", "the first control channel", and the like are names used for ease of understanding and description, and should not constitute any limitation on the present invention. The F transmission elements included in the PRB on which the data channel of the terminal device is located and the M first transmission elements may or may not include same transmission elements. A detailed description is provided later.

The foregoing has described that the network device may implicitly indicate, by using a number of a transmission element, a transmission element that can be used to transmit a data channel and that is in a resource corresponding to the data channel. If the resource corresponding to the data channel includes a second transmission element, the second transmission element may not be used to transmit a control channel.

In other words, the largest number in the M numbers corresponding to the M first transmission elements is k, and the F transmission elements do not include the first transmission element whose number is k. To be specific, the first transmission element that has the largest number and that corresponds to the first control channel is not in the resource corresponding to the data channel.

In this solution, the F transmission elements corresponding to the data channel of the terminal device does not necessarily include a transmission element used to transmit the first control channel, and the M first transmission elements used to transmit the first control channel may be separated from the resource corresponding to the data channel, so that flexibility of resource allocation by the network device can be improved.

In this solution, a control channel of a terminal device is carried on a PRB different from that of a data channel of the terminal device when a transmission element included in the PRB on which the data channel of the terminal device is located is allowed to carry a control channel of another terminal device, so that scheduling flexibility is enhanced.

It should be noted that the network device and the terminal device both know a quantity of transmission elements and numbers of the transmission elements in the system. The terminal device may determine, through blind detection, whether a transmission element corresponding to a number is used to transmit a control channel of the terminal device, and further learn of the number of the transmission element corresponding to the first control channel.

Figure 6:
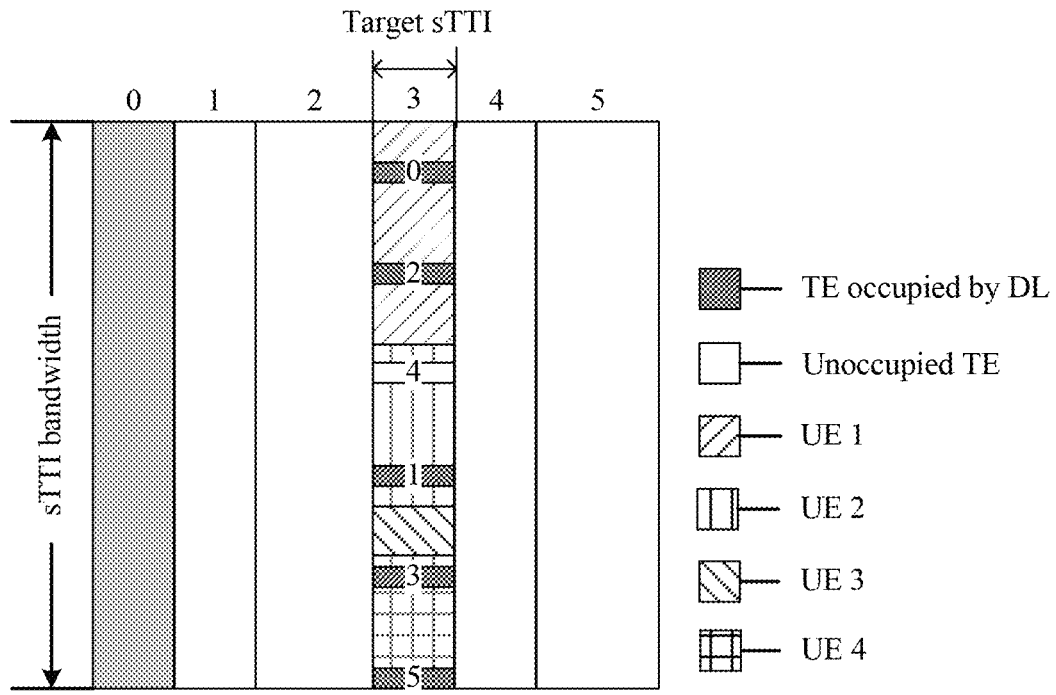
FIG. 6 is a schematic diagram of control channel resource allocation according to an embodiment of the present invention.

Optionally, in the embodiments of the present invention, when allocating transmission elements of control channels to a plurality of terminal devices, the network device may not allocate consecutive transmission elements. FIG. 6 is a schematic diagram of control channel resource allocation according to an embodiment of the present invention. As shown in FIG. 6, a quantity of transmission elements in an sTTI and numbers of the transmission elements may be predefined. In a target sTTI, the network device schedules downlink transmission of four UEs. The network device maps a first control channel of UE 1 to a first transmission element numbered 3. A PRB on which a data channel of the UE 1 is located includes transmission elements numbered 0 and 2, and does not include a second transmission element whose number is greater than 3. In other words, a resource occupied by the data channel of the UE 1 does not include a transmission element. The network device maps a first control channel of UE 2 to a first transmission element numbered 2. A PRB on which a data channel of the UE 2 is located includes transmission elements numbered 1 and 4. The number of the transmission element 4 is greater than 2, and the transmission element 4 may be used to transmit the data channel. The network device maps a first control channel of UE 3 to a first transmission element numbered 1. A PRB on which a data channel of the UE 3 is located does not include a transmission element. The network device maps a first control channel of UE 4 to a first transmission element numbered 5. A PRB on which a data channel of the UE 4 is located includes transmission elements numbered 3 and 5, and it indicates that a resource occupied by the data channel of the UE 4 does not include a transmission element.

Therefore, in the method in the embodiments of the present invention, the transmission element included in the resource of the data channel is not necessarily used to transmit the first control channel, and in this mapping manner, the flexibility of resource allocation by the network device can be improved. Further, in the method in the embodiments of the present invention, the network device can flexibly configure a location of a resource occupied by the first control channel and a location of a resource occupied by the data channel. For example, the resource occupied by the first control channel may be contiguous to the resource occupied by the data channel.

6. sPDCCH Demodulated Based on a DMRS.

In another optional embodiment, the first control channel includes a control channel demodulated based on a DMRS.

In a process of detecting the first control channel demodulated based on a DMRS, the terminal device needs to first determine an antenna port of the first control channel. Optionally, the network device may enable, in a plurality of manners, the terminal device to learn of the antenna port corresponding to the first control channel. In a manner 1, the network device may send, to the terminal device by using physical layer signaling or higher layer signaling, indication information used to indicate the antenna port corresponding to the first control channel. In a manner 2, antenna ports are in correspondence with transmission elements, and the network device implicitly indicates, to the terminal device by using the first transmission element used to transmit the first control channel, the antenna port corresponding to the first control channel. For example, an antenna port corresponding to an even-numbered transmission element is a port 7, and an antenna port corresponding to an odd-numbered transmission element is a port 8.

Optionally, the terminal device may determine, by using an antenna port used for a data channel and an antenna port used for the first control channel, whether a transmission element in a PRB on which the data channel is located can be used to transmit the data channel. Specifically, if the antenna port used for the data channel includes an antenna port used on the transmission element in the PRB on which the data channel is located, the data channel and the transmission element in the PRB on which the data channel is located are demodulated by using a same DMRS antenna port. In this case, a transmission element that is not used to transmit a control channel may be used to transmit the data channel. For example, antenna ports of the data channel are ports 7 and 8, an antenna port corresponding to at least one third transmission element included in the PRB occupied by the data channel is the port 8, and the at least one third transmission element is not occupied by a control channel. In this case, the at least one third transmission element may be used to transmit the data channel.

Figure 7:
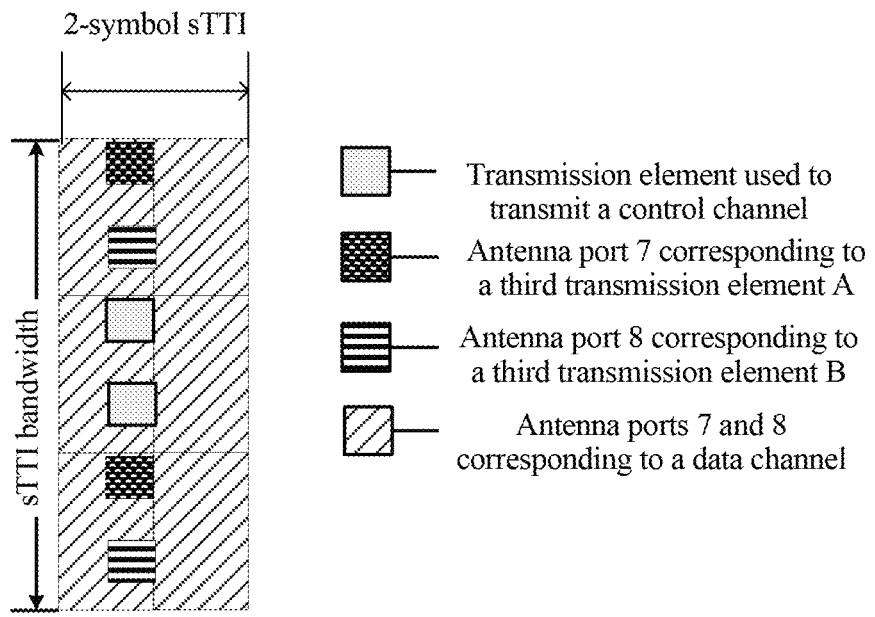
FIG. 7 is a schematic diagram of yet another example of a resource mapping diagram according to an embodiment of the present invention.

FIG. 7 is a schematic diagram of yet another example of a resource mapping diagram according to an embodiment of the present invention. Further, FIG. 7 is specifically a schematic diagram of determining, based on an antenna port of a data channel and an antenna port of a transmission element, a transmission element used for data transmission. As shown in FIG. 7, a data channel region includes six transmission elements, and two transmission elements are used to transmit a control channel. The remaining four transmission elements include two third transmission elements A and two third transmission elements B. An antenna port corresponding to the third transmission element A is a port 7, and an antenna port corresponding to the third transmission element B is a port 8. Antenna ports corresponding to the data channel are ports 7 and 8. Because the data channel and the transmission elements are demodulated by using a same DMRS, the third transmission elements A and the third transmission elements B may be used to transmit the data channel.

Therefore, in the methods in the embodiments of the present invention, a specific transmission element that can be used for data transmission and that is in transmission elements included in a resource corresponding to a data channel may be determined by using an antenna port used for the data channel and an antenna port used on a transmission element in a PRB on which the data channel is located. Therefore, in the method, signaling overheads can be reduced, and operations are simple and easy to implement.

In another optional example of this application, the network device may implicitly indicate, to the terminal device by using an antenna port corresponding to a transmission element included in a PRB occupied by a data channel and numbers of the M first transmission elements, a specific transmission element that can be used to transmit the data channel.

It can be learned from the foregoing descriptions that, if the antenna port of the data channel includes the antenna port corresponding to the transmission element in the PRB occupied by the data channel, and the transmission element is not occupied by the control channel, the transmission element can be used to transmit the data channel. Therefore, at least one third transmission element that is used to transmit the data channel and that is in the F transmission elements may be determined by using the antenna port corresponding to the transmission element.

For example, the numbers of the M first transmission elements include 2 and 3, the antenna port of the data channel is the port 7, numbers of the F transmission elements in the PRB occupied by the data channel include 0, 1, and 4, an antenna port corresponding to the transmission element numbered 0 is also the port 7, and an antenna port corresponding to the transmission element numbered 1 is the port 8. Although the number 0 is less than the number 3, because the transmission element numbered 0 and the data channel correspond to the same antenna port, to be specific, a DMRS corresponding to the transmission element numbered 0 carries same precoding information as the data channel, the transmission element numbered 0 can be used to transmit the data channel. The antenna port corresponding to the transmission element numbered 1 is different from the antenna port of the data channel, and the number is less than 3. Therefore, the transmission element 1 cannot be used to transmit the data channel. Because the number 4 is greater than the number 3, it indicates that the transmission element numbered 4 can be used to transmit the data channel.

Optionally, the network device maps, to a transmission element included in a PRB on which an sPDSCH is located, an sPDCCH used to schedule transmission of the sPDSCH. Optionally, if a terminal device includes both a UL grant and a DL grant, the network device maps, to the transmission element included in the PRB on which the sPDSCH is located, sPDCCHs respectively corresponding to the UL grant and the DL grant. In this manner, the sPDSCH and the sPDCCH may share a same DMRS, thereby reducing DMRS overheads.

It should be understood that in a scheduling process, the following situations may occur: Transmission element resources in a PRB on which a scheduled sPDSCH of a terminal device 1 is located are insufficient, or a PRB on which a scheduled sPDSCH is located does not include a transmission element, or there is only an uplink data sending requirement but no downlink data receiving requirement.

Optionally, the network device determines that at least one fourth transmission element in a data channel region of a first terminal device is used to transmit a third control channel of a second terminal device. An antenna port corresponding to a data channel of the first terminal device is different from an antenna port corresponding to the third control channel, and there is one transmission layer for the data channel of the first terminal device. In other words, antenna port resources for a DMRS are limited. During scheduling, if the network device needs to schedule a control channel of a terminal device to a data channel region of another terminal device, the network device preferentially schedules the control channel of the terminal device to a data channel region of a terminal device having one data transmission layer.

For example, the network device maps a DL grant or a UL grant corresponding to the terminal device 1 to a transmission element that has a relatively small number and that is included in a PRB on which a data channel of a terminal device 2 is located. Therefore, an sPDCCH of the terminal device 1 and an sPDCCH and/or an sPDSCH of the terminal device 2 may be located on a same PRB. In other words, a DMRS of the terminal device 1 and a DMRS of the terminal device 2 may be located on a same PRB. To reduce RE overheads of a DMRS, code division multiplexing may be performed on the DMRS that is of the terminal device 1 and that is used for sPDCCH demodulation and the DMRS that is of the terminal device 2 and that is used for sPDCCH and/or sPDSCH demodulation. In other words, different antenna ports are used for the DMRS of the terminal device 1 and the DMRS of the terminal device 2. Because antenna port resources of a DMRS are limited, preferably, code division multiplexing is performed on the DMRS of the terminal device 1 and a DMRS of a terminal device having a relatively small quantity of data transmission layers. For example, code division multiplexing is preferentially performed on the DMRS of the terminal device 1 and a DMRS of a terminal device transmitting only one layer of data channel.

Optionally, the antenna port corresponding to the first control channel is used by the terminal device to determine an antenna port corresponding to a first data channel.

Optionally, in an example, a same antenna port may be used for the data channel and the first control channel. In other words, the network device configures the same antenna port for the first control channel and the data channel. For example, if the antenna port corresponding to the first control channel is a port 7, the antenna port corresponding to the data channel is also the port 7.

Optionally, in another example, the antenna port of the data channel is related to the antenna port and a rank of the first control channel. A quantity of layers of antennas is defined as a rank of a MIMO channel matrix, that is, a quantity of independent virtual channels. For example, the antenna port corresponding to the first control channel is the port 7, the rank=2, and it indicates that there are two antenna ports for the data channel: the port 7 and the port 8. If the rank=1, it indicates that there is only one antenna port for the data channel: the port 7.

Therefore, in the method in the embodiments of the present invention, the antenna port corresponding to the data channel is determined by using the antenna port corresponding to the first control channel, and no additional signaling indication is needed, so that signaling overheads can be reduced.

It should be noted that when the antenna port corresponding to the first control channel is the port 7, and the rank=2, whether corresponding antenna ports are the port 7 and the port 8 or the port 7 and a port 6 may be agreed on in a protocol or indicated in another manner. This is not limited in the embodiments of the present invention.

Optionally, in a process in which the terminal device receives downlink data, before the data channel is obtained, the first control channel first needs to be demodulated. If the first control channel is a control channel demodulated by using a DMRS, the terminal device may improve, in at least one of the following two manners, efficiency in demodulating the first control channel.

Manner 1. The M First Transmission Elements are Located in a Symbol of a First DMRS.

As described above, using a same design for sPDCCHs in sTTIs having different lengths facilitates scheduling performed by the network device and blind detection performed by the terminal device. The same sPDCCH design is limited to an sTTI having a shortest time-domain length. To be specific, if the system supports a 2-symbol sTTI, a quantity of symbols occupied by a sPDCCH in time domain is most preferably not exceeding 2. Therefore, optionally, when the first DMRS used to demodulate the first control channel is sent in an sTTI, a transmission element used to send the first control channel is located in the symbol occupied by the first DMRS. For example, assuming that the first DMRS is located in a symbol 5 and a symbol 6, a transmission element occupied by the first control channel in an sTTI including the symbol 5 and the symbol 6 may be located in the symbol 5, the symbol 6, or the symbol 5 and the symbol 6.

In the methods in the embodiments of the present invention, the first transmission elements are located in the symbol occupied by the first DMRS, so that control channel designs in different sTTI lengths can be unified, thereby facilitating scheduling performed by the network device and blind detection performed by the terminal device.

In addition, when the first DMRS is closer to the first control channel in time domain, it is more beneficial for the terminal device to quickly demodulate the first control channel based on the first DMRS. When a time-domain resource occupied by the first DMRS includes a time-domain resource corresponding to the M first transmission elements (in other words, when the time-domain resource occupied by the first DMRS includes a time-domain resource occupied by the control channel), the terminal device can obtain the first control channel when obtaining the first DMRS, to efficiently demodulate the first control channel based on the first DMRS. Especially when an sTTI length is seven symbols, this method can obviously reduce a processing latency of the terminal device.

It should be noted that, that the M first transmission elements are located in the symbol of the first DMRS may include at least the following two cases.

Case (1): A time-domain resource corresponding to the M first transmission elements (or the first control channel) and a time-domain resource occupied by the first DMRS are the same and frequency-domain resources are different. For example, the M first transmission elements and the first DMRS are all located in a first symbol or the first two symbols of an sTTI (or a TTI), but the M first transmission elements and the first DMRS occupy different REs.

Case (2). A time-domain resource corresponding to the M first transmission elements is a subset of a time-domain resource occupied by the first DMRS. For example, the M first transmission elements are located in a first symbol of an sTTI (or a TTI), and the first DMRS is located in the first two symbols of the sTTI (or the TTI).

Therefore, in the method in the embodiments of the present invention, efficiency in demodulating the first control channel by the terminal device based on the first DMRS can be further improved.

Manner 2. The First Control Channel is Demodulated Based on a Plurality of DMRSs.

Specifically, the network device may send a second control channel before sending the first control channel. If the first control channel and the second control channel are located on a same PRB, are both control channels demodulated based on a DMRS, and are sent to a same terminal device, the network device may send the first control channel and the second control channel by using a same antenna port and same precoding, and the terminal device may demodulate the first control channel based on a second DMRS of the second control channel and a first DMRS of the first control channel, thereby improving performance of DMRS-based channel estimation, and further increasing a success probability that the terminal device demodulates the first control channel.

For example, the network device first sends the second control channel to the terminal device, and then sends the first control channel. If frequency resources used for the two control channels are the same, the network device sends the second control channel and the first control channel by using the same antenna port and the same precoding, so that the terminal device can demodulate the first control channel jointly by using the second DMRS of the second control channel and the first DMRS of the first control channel.

It should be noted that, the terminal device can make the foregoing assumption only when being permitted by the network device. Optionally, the network device configures, for the terminal device, signaling used to indicate whether it can be assumed that two or more consecutive DMRSs in a same frequency and on a same antenna port use same precoding.

For another example, in a channel transmission process, if the terminal device receives two sTTIs in a subframe that are in a same frequency-domain location (or two sTTIs that are not far away from each other in time domain), and control channels (and/or data channels) are transmitted in the two sTTIs by using a same antenna port, when being permitted by the network device, the terminal device may assume that the antenna port in the two sTTIs uses same precoding, and the terminal device may perform channel estimation on a current control channel (and/or a data channel) jointly by using a DMRS in a previous sTTI and a DMRS in a current sTTI.

It should be noted that in the method in the embodiments of the present invention, the first control channel may be a DL grant or a UL grant, and the second control channel may also be a DL grant or a UL grant.

In the method in the embodiments of the present invention, the terminal device performs channel estimation jointly by using two DMRSs that are in different locations in time domain, so that channel estimation performance can be improved.

It should be noted that mutual reference may be made to various embodiments in the embodiments of the present invention if they are not mutually exclusive.

The foregoing describes the control channel transmission method in the embodiments of the present invention with reference to FIG. 1 to FIG. 7, and the following describes the terminal device and the network device in the embodiments of the present invention with reference to FIG. 8 to FIG. 11.

Figure 8:
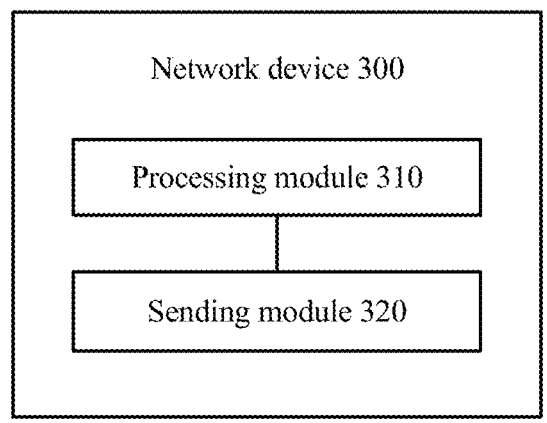
FIG. 8 is a schematic block diagram of an example of a network device according to an embodiment of the present invention.

FIG. 8 is a schematic block diagram of an example of a network device according to an embodiment of the present invention. As shown in FIG. 8, the network device 300 includes: a processing module 310, configured to map a first control channel to M consecutively-numbered first transmission elements, where the first control channel is used to schedule a data channel, and M≥1; and a sending module 320, configured to send the first control channel to a terminal device.

Optionally, the processing module 310 is specifically configured to map the first control channel to the M consecutively-numbered first transmission elements in an order that the first control channel is first mapped to a transmission element having a largest number in the M first transmission elements.

Optionally, each of the M first transmission elements includes T groups of resource elements REs, and the processing module 310 is specifically configured to: when mapping the first control channel, first occupy an $i^{th}$ group of REs in each of the M first transmission elements, and then occupy an $(i+1)^{th}$ group of REs in each first transmission element, where T≥2, and a value of i ranges from 1 to T.

Optionally, the data channel is a downlink data channel. A largest number of the M consecutively-numbered first transmission elements is k, a resource corresponding to the data channel includes at least one second transmission element, and a number corresponding to each of the at least one second transmission element is greater than k.

Optionally, a physical resource block PRB occupied by the resource corresponding to the data channel includes at least one transmission element whose number is less than k, and does not include the first transmission element whose number is k.

Optionally, each of the M first transmission elements is located on N PRBs, N≥2, and locations of at least one of the M first transmission elements on at least two of the N PRBs are different.

Optionally, the sending module 320 is further configured to send a first DMRS to the terminal device. The first DMRS is used to demodulate the first control channel.

Optionally, the M first transmission elements are located in a symbol occupied by the first DMRS.

Optionally, the data channel is a downlink data channel. The resource corresponding to the data channel includes at least one third transmission element, and an antenna port corresponding to the data channel includes an antenna port corresponding to each of the at least one third transmission element.

Optionally, before sending the first control channel to the terminal device, the sending module 320 is further configured to send, to the terminal device, a second control channel and a second DMRS used to demodulate the second control channel, where a same antenna port and same precoding are used for the first control channel and the second control channel, so that the terminal device demodulates the first control channel based on the second DMRS and the first DMRS.

It should be understood that the network device 300 herein is represented in a form of function modules. The term "module" herein may be an application-specific integrated circuit (ASIC), an electronic circuit, a processor (for example, a shared processor, a dedicated processor, or a group processor) configured to execute one or more software or firmware programs and a memory, a combinational logic circuit, and/or another appropriate component supporting the described functions. In an optional example, a person skilled in the art may understand that the network device 300 may be specifically a network device in the communications method in the foregoing embodiment, and the network device 300 may be configured to perform procedures and/or steps corresponding to the network device in the method embodiment. To avoid repetition, details are not described herein again.

Figure 9:
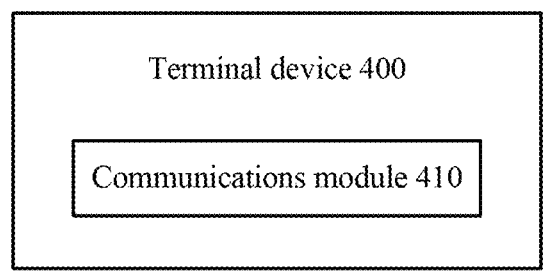
FIG. 9 is a schematic block diagram of an example of a terminal device according to an embodiment of the present invention.

FIG. 9 is a schematic block diagram of an example of a terminal device according to an embodiment of the present invention. As shown in FIG. 9, the terminal device 400 includes: a communications module 410, configured to receive a first control channel sent by a network device, where the first control channel is mapped to M consecutively-numbered first transmission elements, the first control channel is used to schedule a data channel, a transmission element is a smallest unit used to transmit a control channel, and M≥1.

The communications module 410 is further configured to: receive the data channel based on the first control channel, or send the data channel based on the first control channel.

It should be noted that the communications module 410 in this embodiment of the present invention may correspond to a transceiver module. In other words, the communications module may be configured to receive and transmit a signal. Further, the communications module 410 may correspond to a transceiver in an entity apparatus.

Optionally, an order for mapping the first control channel to the M consecutively-numbered first transmission elements is: first mapping the first control channel to a transmission element having a largest number in the M first transmission elements.

Optionally, each of the M first transmission elements includes T groups of resource elements REs, and a mapping manner of mapping the first control channel to the M consecutively-numbered first transmission elements is: first occupying an $i^{th}$ group of REs in each of the M first transmission elements, and then occupying an $(i+1)^{th}$ group of REs in each first transmission element, where T≥2, and a value of i ranges from 1 to T.

Optionally, the data channel is a downlink data channel. A largest number of the M consecutively-numbered first transmission elements is k, a resource corresponding to the data channel includes at least one second transmission element, and a number corresponding to each of the at least one second transmission element is greater than k.

Optionally, a physical resource block PRB occupied by the resource corresponding to the data channel includes at least one transmission element whose number is less than k, and does not include the first transmission element whose number is k.

Optionally, each of the M first transmission elements is located on N PRBs, N≥2, and locations of at least one of the M first transmission elements on at least two of the N PRBs are different.

Optionally, the communications module 410 is further configured to receive a first DMRS sent by the network device. The first DMRS is used to demodulate the first control channel.

Optionally, the M first transmission elements are located in a symbol occupied by the first DMRS.

Optionally, the data channel is a downlink data channel. The resource corresponding to the data channel includes at least one third transmission element, and an antenna port corresponding to the data channel includes an antenna port corresponding to each of the at least one third transmission element.

Optionally, before the communications module 410 receives the first control channel, the communications module 410 is further configured to receive a second control channel and a second DMRS used to demodulate the second control channel that are sent by the network device. A same antenna port and same precoding are used for the first control channel and the second control channel. The terminal device 400 further includes a processing module, configured to demodulate the first control channel based on the second DMRS and the first DMRS.

It should be understood that the terminal device 400 herein is represented in a form of a function module. The term "module" herein may be an application-specific integrated circuit (ASIC), an electronic circuit, a processor (for example, a shared processor, a dedicated processor, or a group processor) configured to execute one or more software or firmware programs and a memory, a combinational logic circuit, and/or another appropriate component supporting the described functions. In an optional example, a person skilled in the art may understand that the terminal device 400 may be specifically a terminal device in the communications method in the foregoing embodiment, and the terminal device 400 may be configured to perform procedures and/or steps corresponding to the terminal device in the method embodiment. To avoid repetition, details are not described herein again.

Figure 10:
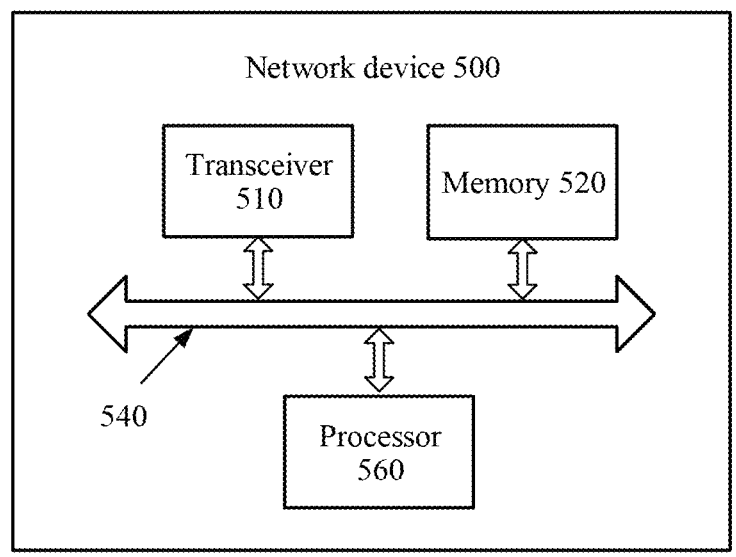
FIG. 10 is a schematic block diagram of another example of a network device according to an embodiment of the present invention.

FIG. 10 is a schematic block diagram of another example of a network device 500 according to an embodiment of the present invention. As shown in FIG. 10, the network device 500 includes a transceiver 510, a memory 520, and a processor 530. The memory 520 is configured to store a program instruction. The processor 530 may invoke the program instruction stored in the memory 520. The processor 530 may control the transceiver 510 to receive or send information. Optionally, the network device 500 further includes a bus system 540 interconnecting the processor 530, the memory 520, and the transceiver 510.

The processor 530 is configured to map a first control channel to M consecutively-numbered first transmission elements, where the first control channel is used to schedule a data channel, and M≥1.

The transceiver 510 is configured to send the first control channel to a terminal device.

Optionally, the processor 530 is specifically configured to map the first control channel to the M consecutively-numbered first transmission elements in an order that the first control channel is first mapped to a transmission element having a largest number in the M first transmission elements.

Optionally, each of the M first transmission elements includes T groups of resource elements REs, and the processor 530 is specifically configured to: when mapping the first control channel, first occupy an $i^{th}$ group of REs in each of the M first transmission elements, and then occupy an $(i+1)^{th}$ group of REs in each first transmission element, where T≥2, and a value of i ranges from 1 to T.

Optionally, the data channel is a downlink data channel. A largest number of the M consecutively-numbered first transmission elements is k, a resource corresponding to the data channel includes at least one second transmission element, and a number corresponding to each of the at least one second transmission element is greater than k.

Optionally, a physical resource block PRB occupied by the resource corresponding to the data channel includes at least one transmission element whose number is less than k, and does not include the first transmission element whose number is k.

Optionally, each of the M first transmission elements is located on N PRBs, N≥2, and locations of at least one of the M first transmission elements on at least two of the N PRBs are different.

Optionally, the transceiver 510 is further configured to send a first DMRS to the terminal device. The first DMRS is used to demodulate the first control channel.

Optionally, the M first transmission elements are located in a symbol occupied by the first DMRS.

Optionally, the data channel is a downlink data channel. The resource corresponding to the data channel includes at least one third transmission element, and an antenna port corresponding to the data channel includes an antenna port corresponding to each of the at least one third transmission element.

Optionally, before the transceiver 510 sends the first control channel to the terminal device, the transceiver 510 is further configured to send, to the terminal device, a second control channel and a second DMRS used to demodulate the second control channel, where a same antenna port and same precoding are used for the first control channel and the second control channel, so that the terminal device demodulates the first control channel based on the second DMRS and the first DMRS.

It should be understood that the network device 500 may be specifically the network device in the foregoing embodiments, and may be configured to perform steps and/or procedures corresponding to the network device in the method embodiment. Optionally, the memory 520 may include a read-only memory and a random access memory, and provide an instruction and data for the processor. A part of the memory may further include a non-volatile random access memory. For example, the memory may further store device type information. The processor 530 may be configured to execute the instruction stored in the memory, and when the processor executes the instruction, the processor may perform the steps corresponding to the network device in the method embodiment.

Figure 11:
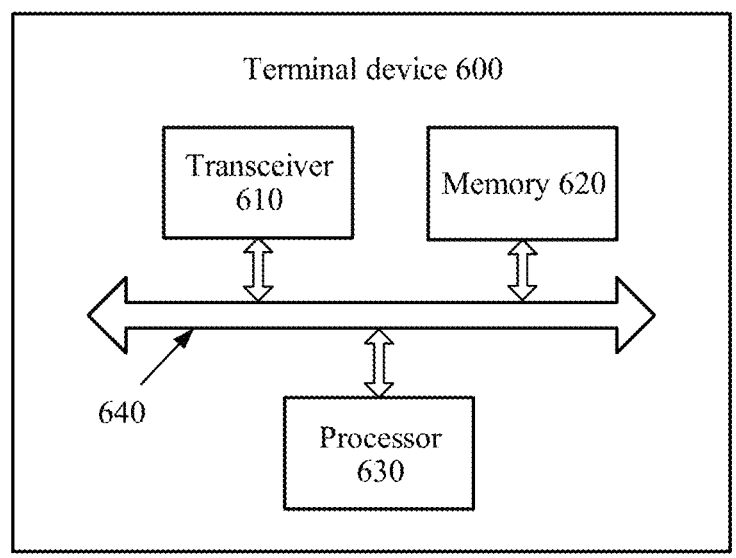
FIG. 11 is a schematic block diagram of another embodiment of a terminal device according to an embodiment of the present invention.

FIG. 11 is a schematic block diagram of another example of a terminal device according to an embodiment of the present invention. As shown in FIG. 11, the terminal device 600 includes a transceiver 610, a memory 620, and a processor 630. The memory 620 is configured to store a program instruction. The processor 630 may invoke the program instruction stored in the memory 620. The processor 630 may control the transceiver 610 to receive or send information. Optionally, the terminal device 600 further includes a bus system 640 interconnecting the processor 630, the memory 620, and the transceiver 610. The processor 630 is configured to control the transceiver 610 to: receive a first control channel sent by a network device, where the first control channel is mapped to M consecutively-numbered first transmission elements, the first control channel is used to schedule a data channel, a transmission element is a smallest unit used to transmit a control channel, and M≥1.

The processor is further configured to control the transceiver to: receive the data channel based on the first control channel, or send the data channel based on the first control channel.

Optionally, an order for mapping the first control channel to the M consecutively-numbered first transmission elements is: first mapping the first control channel to a transmission element having a largest number in the M first transmission elements.

Optionally, each of the M first transmission elements includes T groups of resource elements REs, and a mapping manner of mapping the first control channel to the M consecutively-numbered first transmission elements is: first occupying an $i^{th}$ group of REs in each of the M first transmission elements, and then occupying an $(i+1)^{th}$ group of REs in each first transmission element, where T≥2, and a value of i ranges from 1 to T.

Optionally, the data channel is a downlink data channel. A largest number of the M consecutively-numbered first transmission elements is k, a resource corresponding to the data channel includes at least one second transmission element, and a number corresponding to each of the at least one second transmission element is greater than k.

Optionally, a physical resource block PRB occupied by the resource corresponding to the data channel includes at least one transmission element whose number is less than k, and does not include the first transmission element whose number is k.

Optionally, each of the M first transmission elements is located on N PRBs, N≥2, and locations of at least one of the M first transmission elements on at least two of the N PRBs are different.

Optionally, the transceiver 610 is further configured to receive a first DMRS sent by the network device. The first DMRS is used to demodulate the first control channel.

Optionally, the M first transmission elements are located in a symbol occupied by the first DMRS.

Optionally, the data channel is a downlink data channel. The resource corresponding to the data channel includes at least one third transmission element, and an antenna port corresponding to the data channel includes an antenna port corresponding to each of the at least one third transmission element.

Optionally, before the transceiver 610 receives the first control channel, the transceiver 610 is further configured to receive a second control channel and a second DMRS used to demodulate the second control channel that are sent by the network device. A same antenna port and same precoding are used for the first control channel and the second control channel. The processor 630 is configured to demodulate the first control channel based on the second DMRS and the first DMRS.

It should be understood that the terminal device 600 may be specifically the terminal device in the foregoing embodiments, and may be configured to perform steps and/or procedures corresponding to the terminal device in the method embodiment. Optionally, the memory 620 may include a read-only memory and a random access memory, and provide an instruction and data for the processor. A part of the memory may further include a non-volatile random access memory. For example, the memory may further store device type information. The processor 630 may be configured to execute the instruction stored in the memory, and when the processor executes the instruction, the processor may perform the steps corresponding to the terminal device in the method embodiment.

In this embodiment of the present invention, the processor may be a central processing unit (CPU), a network processor (NP), or a combination of a CPU and an NP. The processor may further include a hardware chip. The hardware chip may be an application-specific integrated circuit (ASIC), a programmable logic device (PLD), or a combination thereof. The PLD may be a complex programmable logic device (CPLD for short), a field-programmable gate array (FPGA), generic array logic (GAL), or any combination thereof.

The transceiver can implement communication between a mobile terminal device and another device or a communications network.

The memory may include a read-only memory and a random access memory, and provide an instruction and data for the processor. A part of the processor may further include a non-volatile random access memory. For example, the processor may further store the device type information.

In addition to a data bus, the bus system may include a power bus, a control bus, a status signal bus, and the like. For ease of representation, only one bold line is used to represent the bus in the figure, but this does not mean that there is only one bus or only one type of bus.

It should be understood that in the embodiments of the present invention, "B corresponding to A" indicates that B is associated with A, and B may be determined based on A. However, it should be further understood that determining B based on A does not mean that B is determined based on A only. B may also be determined based on A and/or other information. It should be understood that the term "and/or" in this specification describes only an association relationship for describing associated objects and represents that three relationships may exist. For example, A and/or B may represent the following three cases: Only A exists, both A and B exist, and only B exists. In addition, the character "/" in this specification generally indicates an "or" relationship between the associated objects.

It should be further understood that sequence numbers of the foregoing processes do not mean execution orders in various embodiments of the present invention. The execution orders of the processes should be determined based on functions and internal logic of the processes, and should not be construed as any limitation on the implementation processes of the embodiments of the present invention.

A person of ordinary skill in the art may be aware that, the units and algorithm steps in the examples described with reference to the embodiments disclosed in this specification may be implemented by electronic hardware or a combination of computer software and electronic hardware. Whether the functions are performed by hardware or software depends on particular applications and design constraint conditions of the technical solutions. A person skilled in the art may use a different method to implement the described functions for each particular application, but it should not be considered that the implementation goes beyond the scope of the present invention.

It may be clearly understood by a person skilled in the art that, for the purpose of convenient and brief description, for a detailed working process of the foregoing system, apparatus, and unit, reference may be made to a corresponding process in the foregoing method embodiments, and details are not described herein again.

In the several embodiments provided in this application, it should be understood that the disclosed system, apparatus, and method may be implemented in other manners. For example, the described apparatus embodiments are merely examples. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be indirect couplings or communication connections via some interfaces, apparatuses, or units, and may be implemented in electronic, mechanical, or other forms.

The units described as separate parts may or may not be physically separate. Parts displayed as units may or may not be physical units, and may be located in one position or distributed on a plurality of network units. Some or all of the units may be selected depending on actual requirements to achieve the objectives of the solutions of the embodiments.

In addition, functional units in the embodiments of the present invention may be integrated into one processing unit, or each of the units may exist alone physically, or two or more units are integrated into one unit.

It may be understood that for conciseness and clarity of this application document, a technical feature and a description in one of the embodiments is applicable to other embodiments. For example, a technical feature of one method embodiment is applicable to an apparatus embodiment or another method embodiment, and details are not described in other embodiments again.

When the functions are implemented in the form of a software functional unit and sold or used as an independent product, the functions may be stored in a computer-readable storage medium. Based on such an understanding, the technical solutions of the present invention essentially, or the part contributing to the prior art, or some of the technical solutions may be implemented in a form of a software product. The computer software product is stored in a storage medium, and includes several instructions for instructing a computer device (which may be a personal computer, a server, a network device, or the like) to perform all or some of the steps of the methods described in the embodiments of the present invention. The foregoing storage medium includes: any medium that can store program code, such as a USB flash drive, a removable hard disk, a read-only memory (ROM), a random access memory (RAM), a magnetic disk, or an optical disc.

The foregoing descriptions are merely specific implementations of the present invention, but are not intended to limit the protection scope of the present invention. Any variation or replacement readily figured out by a person skilled in the art within the technical scope disclosed in the present invention shall fall within the protection scope of the present invention. Therefore, the protection scope of the present invention shall be subject to the protection scope of the claims.

What is claimed is:

1. A method, comprising:
   receiving a first control channel from a network device, wherein the first control channel is mapped to M consecutively-numbered transmission elements, the first control channel is used to schedule a data channel, each transmission element of the M consecutively-numbered transmission elements is respectively a smallest unit used to transmit the first control channel, and M≥1, and wherein each of the M consecutively-numbered transmission elements comprises T groups of resource elements (REs); and
   receiving or sending data on the data channel based on the first control channel;
   wherein the first control channel is mapped to the M consecutively-numbered transmission elements in an interleaved mapping manner that comprises:
   successively occupying a respective $i^{th}$ group of REs in each of the M consecutively-numbered transmission elements; and
   after all the respective $i^{th}$ groups of REs in each of the M consecutively-numbered transmission elements are occupied, successively occupying a respective $(i+1)^{th}$ group of REs in each of the M consecutively-numbered transmission elements, wherein T≥2, and a value of i ranges from 1 to T.

2. The method according to claim 1, wherein the first control channel being mapped to the M consecutively-numbered transmission elements further comprises:
   the first control channel being mapped to the M consecutively-numbered first transmission elements in an order that the first control channel is first mapped to a transmission element having a largest number in the M consecutively-numbered first transmission elements.

3. The method according to claim 1, wherein the data channel is a downlink data channel; and
   wherein a largest number of the M consecutively-numbered transmission elements is k, a resource corresponding to the data channel comprises at least one second transmission element, and a number corresponding to each second transmission element of the at least one second transmission element is greater than k.

4. The method according to claim 3, wherein a physical resource block (PRB) occupied by the resource corresponding to the data channel comprises at least one transmission element whose number is less than k, and the PRB occupied by the resource corresponding to the data channel does not comprise a first transmission element of the M consecutively-numbered transmission elements whose number is k.

5. The method according to claim 1, wherein each of the M consecutively-numbered transmission elements is located on N PRBs, N≥2, and locations of at least one of the M consecutively-numbered transmission elements on at least two of the N PRBs are different.

6. The method according to claim 1, further comprising:
receiving a first demodulation reference signal (DMRS) from the network device, wherein the first DMRS is used to demodulate the first control channel.

7. The method according to claim 6, wherein the M consecutively-numbered transmission elements are located in a symbol occupied by the first DMRS.

8. The method according to claim 6, wherein:
the data channel is a downlink data channel; and
a resource corresponding to the data channel comprises at least one third transmission element, and an antenna port corresponding to the data channel corresponds to each of the at least one third transmission element.

9. The method according to claim 6, wherein before receiving the first control channel from a network device, the method further comprises:
receiving a second control channel and a second DMRS used to demodulate the second control channel from the network device, wherein a same antenna port and same precoding are used for the first control channel and the second control channel; and
wherein receiving the first control channel from the network device comprises:
demodulating the first control channel based on the second DMRS and the first DMRS.

10. A device, comprising:
a processor; and
a non-transitory memory storing program instructions that are executable by the processor, the program instructions including instructions for:
receiving a first control channel from a network device, wherein the first control channel is mapped to M consecutively-numbered transmission elements, the first control channel is used to schedule a data channel, each first transmission element of the M consecutively-numbered transmission elements is respectively a smallest unit used to transmit the first control channel, and M≥1, and wherein each of the M consecutively-numbered transmission elements comprises T groups of resource elements (REs); and
receiving data on the data channel based on the first control channel, or sending data on the data channel based on the first control channel;
wherein the first control channel is mapped to the M consecutively-numbered transmission elements in an interleaved mapping manner that comprises:
successively occupying a respective $i^{th}$ group of REs in each of the M consecutively-numbered transmission elements; and
after all the respective $i^{th}$ groups of REs of the M consecutively-numbered transmission elements are occupied, successively occupying an $(i+1)^{th}$ group of REs in each of the M consecutively-numbered transmission elements, wherein T≥2, and a value of i ranges from 1 to T.

11. The device according to claim 10, wherein the first control channel being mapped to the M consecutively-numbered transmission elements further comprises:
the first control channel being mapped to the M consecutively-numbered first transmission elements in an order that the first control channel is first mapped to a transmission element having a largest number in the M consecutively-numbered first transmission elements.

12. The device according to claim 10, wherein the data channel is a downlink data channel; and
wherein a largest number of the M consecutively-numbered transmission elements is k, a resource corresponding to the data channel comprises at least one second transmission element, and a number corresponding to each second transmission element of the at least one second transmission element is greater than k.

13. The device according to claim 12, wherein a physical resource block (PRB) occupied by the resource corresponding to the data channel comprises at least one transmission element whose number is less than k, and the PRB occupied by the resource corresponding to the data channel does not comprise a transmission element of the M consecutively-numbered first transmission elements whose number is k.

14. The device according to claim 10, wherein each of the M consecutively-numbered transmission elements is located on N PRBs, N≥2, and locations of at least one of the M consecutively-numbered first transmission elements on at least two of the N PRBs are different.

15. The device according to claim 10, wherein the program instructions further include instructions for:
receiving a first demodulation reference signal (DMRS) from the network device, wherein the first DMRS is used to demodulate the first control channel.

16. The device according to claim 15, wherein the M consecutively-numbered transmission elements are located in a symbol occupied by the first DMRS.

17. A non-transitory computer-readable storage medium comprising instructions which, when executed by a computer hardware of a control plane network element, cause the computer hardware to:
receive a first control channel from a network device, wherein the first control channel is mapped to M consecutively-numbered transmission elements, the first control channel is used to schedule a data channel, each transmission element of the M consecutively-numbered transmission elements is respectively a smallest unit used to transmit the first control channel, and M≥1, and wherein each of the M consecutively-numbered transmission elements comprises T groups of resource elements (REs); and
receive data on the data channel based on the first control channel, or send data on the data channel based on the first control channel;
wherein the first control channel is mapped to the M consecutively-numbered transmission elements in an interleaved mapping manner that comprises:
successively occupying a respective $i^{th}$ group of REs in each of the M consecutively-numbered transmission elements; and
after all the respective $i^{th}$ groups of REs of the M consecutively-numbered transmission elements are occupied, successively occupying a respective $(i+1)^{th}$ group of REs in each of the M consecutively-numbered transmission elements, wherein T≥2, and a value of i ranges from 1 to T.

* * * * *